(12) United States Patent
Furukawa et al.

(10) Patent No.: US 6,539,226 B1
(45) Date of Patent: Mar. 25, 2003

(54) BASE STATION TRANSMISSION POWER CONTROL SYSTEM MOBILE STATION AND BASE STATION

(75) Inventors: Hiroshi Furukawa, Tokyo (JP); Kojiro Hamabe, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,704

(22) Filed: Feb. 12, 1999

(30) Foreign Application Priority Data

Mar. 26, 1998 (JP) .......................................... 10-078702
Feb. 16, 1998 (JP) .......................................... 10-048550

(51) Int. Cl.$^7$ ................................................ H04Q 7/20
(52) U.S. Cl. ........................ 455/442; 455/436; 455/522
(58) Field of Search .................................. 455/442, 436, 455/439, 522, 525

(56) References Cited

U.S. PATENT DOCUMENTS

| 5,295,152 A | * | 3/1994 | Gudmundson et al. | .... 455/33.1 |
| 5,430,760 A | * | 7/1995 | Dent | .......................... 455/54.2 |
| 5,771,451 A | * | 6/1998 | Takai et al. | .................. 455/442 |
| 6,011,980 A | * | 1/2000 | Nagano et al. | ............. 455/572 |
| 6,031,828 A | * | 2/2000 | Koro et al. | ................. 455/67.1 |

FOREIGN PATENT DOCUMENTS

| JP | 7-107033 | 4/1995 |
| JP | 8-18503 | 1/1996 |
| JP | 9-74378 | 3/1997 |
| JP | 9-139712 | 5/1997 |
| JP | 9-312609 | 12/1997 |
| WO | WO 97/08911 | 3/1997 |

OTHER PUBLICATIONS

Majid Soleimanipour, et al., "A Realistic Approach to the Capacity of Cellular CDMA Systems", Proceedings of IEEE Vehicular Techology Conference, pp. 1125–1129, 1996.

Fumio Kikuchi, et al., "Forward Power Control for DS–CDMA Cellular System", The Institute of Electronics, Information and Communication Engineers, Technical Report of IEICE, CS96–20, RCS96–13 (May 1996), pp. 33–38.

(List continued on next page.)

*Primary Examiner*—Daniel Hunter
*Assistant Examiner*—Thuan Nguyen
(74) *Attorney, Agent, or Firm*—Scully, Scott, Murphy & Presser

(57) ABSTRACT

In soft hand over in a code division multi access mobile radio communication system, interference in a down link caused by transmission from a plurality of base stations for one mobile station, can be restricted. Control of transmission power is performed according to command from the mobile station only in the base station serving as a primary base station which has minimum propagation loss with the mobile station during soft hand over, and the base stations other than the primary base station perform transmission with restricting output. In comparison with the transmission power control performed by the conventional plural base station transmission, interference for the peripheral mobile station can be reduced to achieve higher down link capacity. Also, upon restricting transmission power of the base station other than the base stations having small propagation loss with the mobile station among base station group in soft hand over, by moderately attenuating the transmission power instead of restricting abruptly, degradation of the reception quality can be prevented when error is caused in selection of the base station.

12 Claims, 32 Drawing Sheets

OTHER PUBLICATIONS

Kojiro Hamabe, et al., "Transmission Power Control Based on Neighboring–cell Pilot Power for CDMA Forward Link", The Institute of Electronics, Information and Communication Engineers, Technical Report of IEICE, RCS96–84 (Aug. 1996), pp. 125–131.

Etsuhiro Nakano, et al., "Effects of Site Diversity for DS/CDMA Cellular Systems", The Institute of Electronics, Information and Communication Engineers, Technical Report of IEICE, A–P94–76, RCS94–100 (Oct. 1994), pp. 69–74.

Hiroshi Furukawa, "Effect of Spatial Correlation of Path Loss for Soft–Handoff", Communication Society Conference 1997, The Institute of Electronics, Information and Communication Engineers, pp. 264, Chapter 3.

* cited by examiner

BASE STATION

FIG. 25

| TRANSMISSION POWER CONTROL SIGNAL | TRANSMISSION POWER CONTROL SIGNAL BIT STRING |
|---|---|
| Spct = i0 | 1 1 1 |
| Spct = 0 | 0 0 0 |

BASE STATION

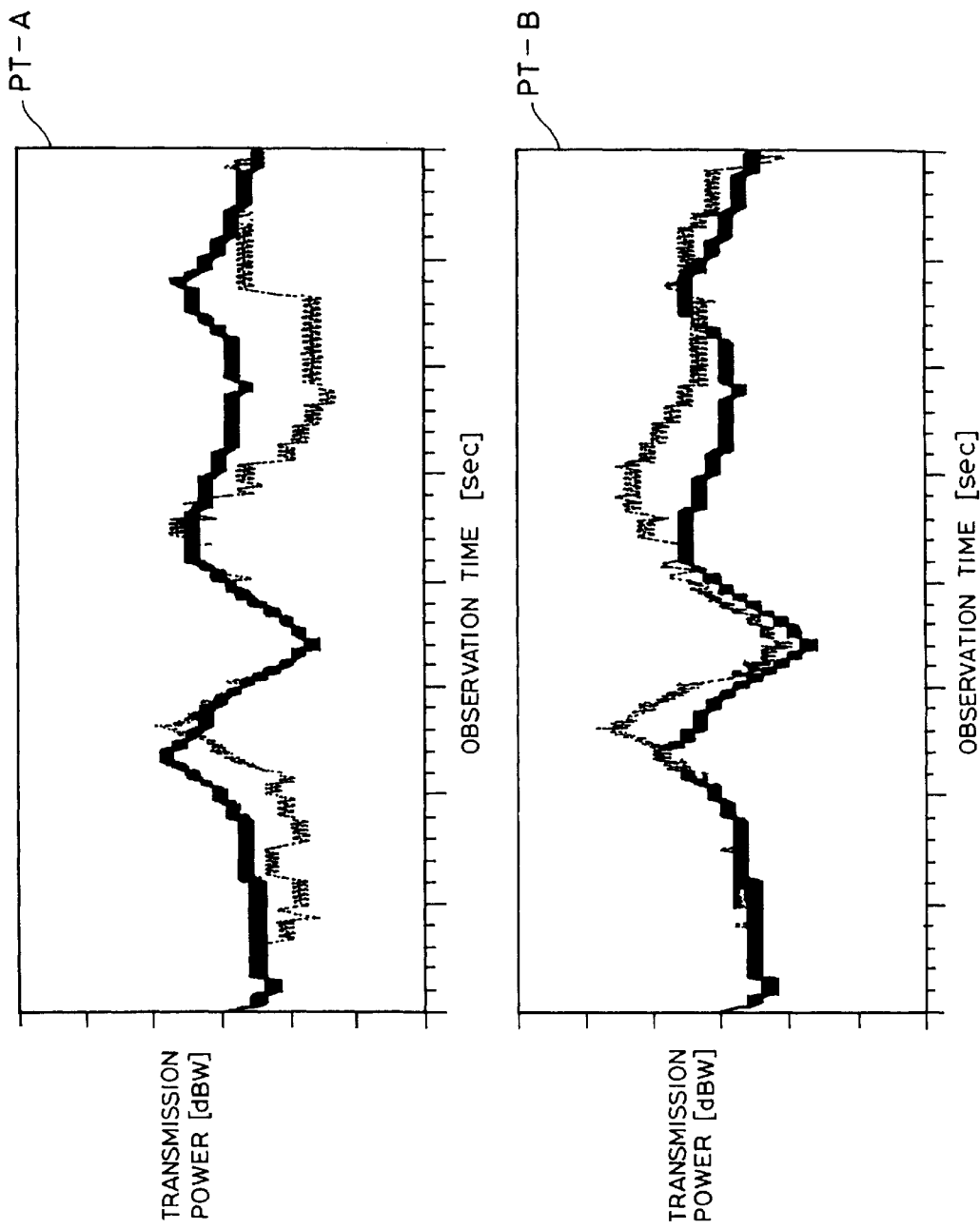

BASE STATION TRANSMISSION POWER CONTROL SYSTEM MOBILE STATION AND BASE STATION

BACKGROUND OF THE INVENTION

1. Field of the Invention

The present invention relates generally to a mobile communication system, and a mobile station and a base station to be employed therein. More particularly, the invention relates to a transmission power control system in a code divided multi access (CDMA) cellular system, to which soft hand over is applied.

2. Description of the Related Art

In a code divided multi access (CDMA) cellular mobile telephone system, a base station transmission power control technology for controlling a transmission power of a signal to be transmitted from a base station equipment on the basis of a power control information from a mobile station equipment, is employed. FIGS. 30 and 31 are illustrations respectively showing control blocks of a mobile station and a base station for explaining the conventionally typical base station transmission power control method in the CDMA cellular mobile telephone system.

At first, discussion will be given for a control for transmitting the power control information from the mobile station equipment with reference to FIG. 30. In the mobile station, a transmission signal to be transmitted from the base station is received and demodulated by a transmission/reception common unit 1, an RF portion 2 and a demodulation 3, and a reception quality Rq [dB] is measured by a reception quality measuring device 4. Here, the reception quality is measured as a ratio of a received power of the base station transmission signal and unwanted signal power, such as interference and so forth, or a ratio of a received power of the base station transmission signal and an arbitrary reference received power constant.

The received reception quality Rq is compared with a required quality Rth by a comparing portion 14. When the reception quality Rq is greater than the required quality Rth, a transmission power control bit is set at "0" in a processing portion 15. Otherwise, the transmission power control bit is set at "1" by a processing portion 16. The set transmission power control bit is inserted in a transmission signal by a transmission power control bit inserting portion 17. Also, an overhead symbol containing various control information and so forth is inserted in an overhead inserting portion 10.

A transmission data containing the transmission power control bit and an overhead information is transmitted to the base station via a spreading portion 9, a modulator 8 and an amplifier device 7 of the mobile station equipment.

Next, discussion will be given for a transmission power control in the base station on the basis of the power control information from the mobile station with reference to FIG. 31. A reception signal including various data or various control information from the mobile station is received and demodulated via a transmission/reception common unit 21, an RF portion 22, a down converter 23, a despreading portion 24 and a reception data demodulator 25. Then, the transmission power control bit is extracted in the transmission power control bit detector 31.

The extracted transmission power control bit is judged whether the value thereof is "1" or not in a processing portion 32. If the transmission power control bit is "1", a fixed transmission power control amount ΔP is added for a current transmission power control signal Pctl in a processing portion 33. Otherwise, the fixed transmission power control amount ΔP is subtracted. A transmission spreading RF signal 28 is amplified by a variable amplifier 29 taking the current transmission power control signal Pctl as a control value and transmitted to the mobile station via the transmission/reception common unit 21.

As set forth above, by the transmission power control according to the transmission power control block diagram, the base station transmission power control, in which the reception quality in the mobile station becomes Rth, can be achieved.

In addition to the foregoing transmission power control system (hereinafter referred to as "system A"), some transmission power control systems have been invented. For example, in a transmission power control system (hereinafter referred to as "system B") recited in Kikuchi, Higashi, Ono, Technical Report of the Institute of Electronics, information and Communication Engineers, RCS96-13, May, 1996, pp 34, right column, links 1–15, there has been proposed a method, in which all of the base station collects communication quality information of all of the connected mobile stations to determine a transmission power unitarily so as to achieve a required quality. By this method, developing of the transmission power can be completed at high speed to restrict occurrence of excessive transmission power during a period required for developing the transmission power.

On the other hand, in the transmission power control system (hereinafter referred to as "system C") recited in Hamabe, Yoshida, Ushirbkawa, Technical Report of the Institute of Electronics, Information and Communication Engineers, RCS-84, August, 1996, pp 126, Section 2.1, there has been proposed a method, in which distribution amounts of the transmission power of the base station for respective mobile stations are determined by the mobile stations on the basis of a pilot reception power, and the base station unitarily determines the transmission power for respective mobile stations on the basis of the distribution information. Instead of seeking for the transmission power control system achieving the reception quality at the desired quality in respective mobile stations as in the systems A and B, this system C is directed only to make the reception quality of all of the mobile stations uniform. Accordingly, while interference restriction effect is considered to be lower in comparison with the system A, high precision and stable control can be performed as system makes reference to the pilot signal transmitted with high power.

In the cellular mobile communication, hand over, in which connected base stations are switched, is effected according to movement of the mobile station. The mobile station in the CDMA cellular mobile communication system, in which all base stations use the same frequency simultaneously, interference for other radio link has to be minimized by constantly connecting to the base station, at which a propagation loss becomes minimum (primary base station), and by performing transmission power control. However, since certain period is required for hand over to new base station, delay in connection with the primary base station can be caused to encounter a drawback in that communication with excessive power is inherent. Therefore, a method that the mobile station is connected to a plurality of base stations to preliminarily take the primary base stations, is employed. This method is referred to as soft hand over (or soft hand off).

Concerning the base station transmission power control during soft hand over, control system disclosed in Japanese Unexamined Patent Publication No. Heisei 9-74378 (hereinafter referred to as "system D").

In the system D, concerning distribution method of the transmission power per the base station, there has been disclosed three methods, i.e. a method effecting distribution for equalizing the reception powers from respective base stations in the mobile station, a method effecting distribution for making a ratios of the reception power from respective base stations in the mobile station to be equal to the pilot reception level ratio, and a method effecting distribution for making the transmission powers of respective base stations equal to the ratio of the pilot reception level in the mobile station.

On the other hand, a related art relating to the base station transmission power control during soft hand over has been disclosed in commonly owned U.S. patent application Ser. No. 09/090,013. With the disclosed technology, reception qualities of down signals from a plurality of base stations during hand over are monitored in the mobile station and a signal designating the base station to effect transmission according to the result of monitoring is transmitted. Then, in the base station, transmission power control of the down transmission signal to the mobile station is performed according to the base station designation signal.

The conventional transmission power control system for a down link as represented by the foregoing systems A to D, is premised a plural base station transmission, in which a plurality of base stations perform transmission simultaneously during soft hand over. The soft hand over is an essential technology for realizing communication with the base station of the minimum propagation loss in an actual system, in which hand over control delay cannot be ignored. However, concerning the down link, since a plurality of the base stations has to effect transmission for one mobile station, interference to be caused on the mobile station can be increased. Such problem will be discussed with reference to FIGS. 32 and 33.

FIG. 32 is an illustration showing reception signals received by respective mobile stations MS-A and MS-B located in zones Z-A and Z-B respectively covered by the base stations BS-A and BS-B in non-soft hand over state. In the shown condition, the mobile station MS-A is receiving a desired wave of a reception power of PTd-A from the connected base station BS-A and an interference wave of reception power of PTi-B from a non-connected base station BS-B. On the other hand, the mobile station MS-B is receiving a desired wave of a reception power of PTd-B from the connected base station BS-B and an interference wave of reception power of PTi-A from a non-connected base station BS-A. A ratio of the desired wave reception power versus the interference wave reception power observed by the mobile station MS-B becomes PTd-B/PTi-A. Next, similarly to FIG. 32, consideration is given for the base where soft hand over of the mobile station MS-A and the base station BS-B.

FIG. 33 shows the reception signals received by both mobile stations during soft hand over in the mobile station MS-A. The mobile station MS-A in soft hand over receives the desired signal of the reception power of PTd-A from the base station BS-A and the desired signal of the reception power of PTd-A' from the base station BS-B, namely two desired signals in total. By diversity reception of both desired signal waves in the mobile station MS-A, a diversity gain can be obtained. On the other hand, the signal transmitted by the base station BS-B for soft hand over with the mobile station MS-A, is received as the interference wave in the mobile station MS-B. Assuming that the reception power of the interference wave in the mobile station MS-B is PTi-A', the ratio of the desired wave reception power versus the interference wave reception power as observed by the mobile station MS-B becomes PTd-B/(PTi-A+PTi-A'). This is smaller than PTd-B/PTi-A of the ratio of the desired wave reception power versus the interference wave reception power during non-sift hand over state set forth above to cause lowering of reception quality by increasing of interference.

Lowering of the reception quality can be compensated in certain extent by also effecting soft hand over in the mobile station MS-B. However, according to M. Soleimanpor and G. H. Freeman, Proceeding of IEEE Vehicular Technology Conference, pp. 1129, right-side column, links 15 to 31, in which increasing amount of interference and the diversity gain by site diversity, increasing amount of interference is greater, As a result, capacity of the down link is restricted. Similar assertion has also be seen in Nakano, Umeda, Ohno, Technical Report of the Institute of Electronics, Information and Communication Engineers, RCS94-100, pp 71, left column, links 1 to 8.

It should be noted that increasing of interference by the plural base station transmission of the down link set forth above will not raise problem in so-called hard hand over in which simultaneous communication between a plurality of base stations and the mobile station is not performed. In this case, influence of hand over period of the base station namely hand over control delay can be a problem. According to Furukawa, Communication Society Conference 1997 of the Institute of Electronics, Information and Communication Engineers, pp. 264, Chapter 3, it is stated that greater transmission power is radiated at greater hand over control delay. Hard hand over under a condition where the hand over control delay cannot be ignored, is inherently performed at an excessive transmission power for the mobile station in formerly connected base station before hand over in order to forcedly establish communication with the formerly connected base station which is currently non-minimum propagation loss base station for the mobile station. As a result, interference for the peripheral mobile stations is increased.

In order to reflect the transmission power control signal from the mobile station in the base station with high fidelity, the transmission power control signal has to be transmitted with small error and small delay. On the other hand, in order to effectively use the communication link, it is desirable that a power of the transmission power control signal is as small as possible. As a technology for reducing reception error, there is a method of interleave, error correction and so forth applied for transmission of the signal of voice, data and so forth. However, this technology is not applied to the transmission power control signal for causing increasing of decoding delay or additional information. As a result, frequency of occurrence of error of the transmission power control signal becomes high in comparison with the data signal. Particularly, upon soft hand over, in the non-primary base station, in which propagation loss is large, reception error becomes large.

When reception error of the transmission power control signal is caused, the transmission power control command from the mobile station cannot be reflected well. Thus, the base station is forced to perform communication at inappropriate transmission power. This will be discussed with reference to FIG. 34. FIG. 34 illustrates variation of the transmission power in time PT-A, PT-B and PT-A', PT-B' of respective base station while soft hand over is performed between a certain mobile station and two base stations BS-A and BS-B. In FIG. 34, a vertical axis represents a transmission power [dBW] of base station and a horizontal axis represents a time [sec].

As shown in FIG. 34, when reception error is not caused in the transmission power control, as illustrated by solid links of variation in time transitions PT-A and PT-B, the transmission power of both base stations are maintained at equal value. On the other hand, when reception error is caused in the transmission power control signal as illustrated by dotted link of variation in time transitions PT-A and PT-B, it can be appreciated that lacking of the transmission power is continuously caused in PT-A and excessive transmission power is continuously caused in PT-B. Particularly, when excessive transmission power is continuously caused as in the variation in time transition PT-B, interference is caused for the peripheral cells to reduce capacity to be received in the system.

SUMMARY OF THE INVENTION

It is an object of the present invention to obtain high down link capacity with restricting increasing of interference by plural base station transmission upon soft hand over.

Another object of the present invention is to prevent excessive radiation of a transmission power due to switching of connection of base stations upon hand over, namely due to hand over control delay.

A further object of the present invention is to prevent base station group from transmitting inappropriate transmission power due to reception error of a transmission power control signal during soft hand over.

A still further object of the present invention is to prevent increasing of interference by a plurality of base stations during soft hand over of down link.

According to the first aspect of the present invention, a base station transmission power control system in a code division multi access cellular mobile radio communication system comprises a plurality of base stations respectively announcing unique pilot signals and a mobile station which is capable of simultaneously establishing connection with a soft hand over base station group consisted of some of base stations out of the base stations in the system, wherein the soft hand over base station group includes a primary base station having minimum propagation loss with the mobile station during soft hand over and remaining base stations being restricted outputs.

According to the second aspect of the present invention, a base station transmission power control system in a code division multi access cellular mobile radio communication system comprises a plurality of base stations respectively announcing unique pilot signals and a mobile station which is capable of simultaneously establishing connection with a soft hand over base station group consisted of some of base stations out of the base stations in the system, wherein the mobile station detects a communication reception quality and a primary base station among the base stations, reception level of pilot signal of which becomes maximum among pilot signals received from respective base stations in the soft hand over base station group, notifies a base station number of the primary base station as a transmission power control signal for respective of the base stations in the soft hand over base station group when the communication reception quality is lower than a desired quality, and notifies a number other than the base station number of the base stations in the soft hand over base station group when the communication reception quality is in excess of the desired quality; and each base station in the soft hand over base station group receives the transmission power control signal and being restricted a transmission power when a content of the transmission power control signal identifies number other than own base station number.

According to the third aspect of the present invention, a base station transmission power control system in a code division multi access cellular mobile radio communication system comprises a plurality of base stations respectively announcing unique pilot signals and a mobile station which is capable of simultaneously establishing connection with a soft hand over base station group consisted of some of base stations out of the base stations in the system, wherein the mobile station detects a communication reception quality and a primary base station among the base stations, reception level of pilot signal of which becomes maximum among pilot signals received from respective base stations in the soft hand over base station group, increases and decreases the base station transmission power value managed by the mobile station so that the communication reception quality becomes a desired quality, and transmits a transmission power control signal consisted of a base station number of the primary base station and the base station transmission power value to the soft hand over base station group, and each base station of the soft hand over base station group receives the transmission power control signal, setting the base station transmission power value managed by the mobile station and contained in the transmission power control signal to a transmission power value of own station when the base station number contained in the transmission power control signal is consistent with own base station number, and sets the transmission power value of own station at a restricted transmission power value when the base station number contained in the transmission power control signal is not consistent with own base station number.

According to the fourth aspect of the present invention, a base station transmission power control system in a code division multi access cellular mobile radio communication system comprises a plurality of base stations respectively announcing unique pilot signals and a mobile station which is capable of simultaneously establishing connection with a soft hand over base station group consisted of some of base stations out of the base stations in the system, wherein the mobile station detects a communication reception quality and a primary base station among the base stations, reception level of pilot signal of which becomes maximum among pilot signals received from respective base stations in the soft hand over base station group, sets a power increasing symbol in a transmission power control bit when the communication reception quality does not exceed the desired quality, setting a power decreasing symbol in the transmission power control bit when the communication reception quality exceeds the desired quality, and transmits the transmission power control bit to the soft hand over base station group and intermittently transmitting the primary base station number, and each base station of the soft hand over base station group receiving the transmission power control signal which includes a primary base station number, and restricting a transmission power of one station following to the current timing when the primary base station number is not consistent with own base station number.

A base station transmission power control system in a code division multi access cellular mobile radio communication system comprising a plurality of base stations respectively announcing unique pilot signals and a mobile station which is capable of simultaneously establishing connection with a soft hand over base station group consisted of some of base stations out of the base stations in the system, wherein the mobile station detecting a communication reception quality and a primary base station among the base stations, reception level of pilot signal of which becomes maximum among pilot signals received from respective base stations in the soft hand over base station group, setting a power increasing symbol in a transmission power control bit when the communication reception quality does not exceed the desired quality, setting a power decreasing symbol in the transmission power control bit when the communication reception quality exceeds the desired quality, transmits a transmission power control signal consisted of the transmission power control bit or a transmission power control signal consisted of the primary base station number to the soft hand over base station, and each base station in the soft hand over base station group receives the transmission power control signal, and restricts a transmission power of own station for current and subsequent timing when the primary base station number is not consistent with own base station number.

According to the fifth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprises:

primary base station determining means for determining a primary base station having a minimum propagation loss during soft hand over; and commanding means for commanding restriction of a transmission power for the base stations in the soft hand over base station group other than the primary base station.

According to the sixth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprises:

means for detecting a primary base station which transmits a pilot signal of the maximum reception level at the mobile station among received pilot signals from the base stations in the soft hand over base station group, and means for transmitting a transmission power control signal consisted of the base station number of the primary base station and the base station transmission power value by increasing and decreasing the base station transmission power value managed by the mobile station so that the reception quality becomes a desired quality.

According to the seventh aspect of the present invention, a base station in a code division multi access cellular mobile radio communication system announcing a unique pilot signal and is capable of simultaneously establishing connection with a mobile station together with other base stations in a soft hand over base station group consisted of some of base stations, comprises:

transmission power control signal detecting means for detecting a transmission power control signal from the mobile station; and transmission power control means for restricting a transmission power when a primary base station information in the transmission power control signal does not identify own station.

According to the eighth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprises:

reception quality detecting means for detecting a communication reception quality; primary base station detecting means for detecting primary base station which transmits a pilot signal of the maximum reception level at the mobile station among received pilot signals from the base stations in the soft hand over base station group;

base station transmission power managing means for holding a base station transmission power value, increasing the base station transmission power value when the communication reception quality detected by the reception quality detecting means does not exceed a desired quality and decreasing the base station transmission power value when the communication reception quality detected by the reception quality detecting means exceeds the desired quality; and control signal transmitting means for transmitting the primary base station information detected by the primary base station detecting means and the base station transmission power value held in the base station transmission power managing means as a transmission power control signal to the soft hand over base station group.

According to the ninth aspect of the present invention, a base station in a code division multi access cellular mobile ratio communication system announcing a unique pilot signal and is capable of simultaneously establishing connection with a mobile station together with other base stations in a soft hand over base station group consisted of some of base stations, comprises:

control signal receiving means for receiving a transmission power control signal from the mobile station;

control signal separating means for separating a primary base station information and a base station transmission power value information from the transmission power control signal; and transmission power control means for performing transmission with the base station transmission power indicated by the base station transmission power value information when the primary base station information separated by the control signal separating means indicates a base station information of own station, and performing transmission with a minimum transmission power when the primary base station information detected by the control signal separating means does not indicate the base station information of own station.

According to the tenth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprising:

reception quality detecting means for detecting a communication reception quality; primary base station detecting means for detecting primary base station which transmits a pilot signal of the maximum reception level at the mobile station among received pilot signals from the base stations in the soft hand over base station group;

base station transmission power control signal determining means for setting a base station transmission power control signal for increasing power when the communication reception quality detected by the reception quality detecting means does not exceed a desired quality and setting the base station transmission power control signal for decreasing power when the communication reception quality detected by the reception quality detecting means exceeds a desired quality; and control signal transmitting means for transmitting the base station transmission power control signal determined by the base station control signal determining means to the base station group in soft hand over or intermittently transmitting a primary base station information detected by the primary base station detecting means and the base station transmission power control signal determined by the base station control signal determining means to the base station group in soft hand over.

According to the eleventh aspect of the present invention, a base station in a code division multi access cellular mobile radio communication system announcing a unique pilot signal and is capable of simultaneously establishing connection with a mobile station together with other base stations in a soft hand over base station group consisted of some of base stations, comprises:

control signal receiving means for receiving a transmission power control signal from the mobile station;

primary base station information separating means for separating a primary base station information and a base station transmission power value information from the transmission power control signal; and transmission power control means for increasing and decreasing a transmission power for current and subsequent timing according to the transmission power control signal when the primary base station information is contained in the transmission power control signal and the primary base station information indicates the base station information of own station and setting the transmission power to a minimum transmission power for current and subsequent timing when the primary base station information is contained in the transmission power control signal and the primary base station information does not indicate the base station information of own station.

According to the twelfth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprises:

reception quality detecting means for detecting a communication reception quality; primary base station detecting means for detecting primary base station which transmits a pilot signal of the maximum reception level at the mobile station among received pilot signals from the base stations in the soft hand over base station group;

base station transmission power control signal determining means for setting a base station transmission power control signal for increasing power when the communication reception quality detected by the reception quality detecting means does not exceed a desired quality and setting the base station transmission power control signal for decreasing power when the communication reception quality detected by the reception quality detecting means exceeds a desired quality; and control signal transmitting means for transmitting the base station transmission power control signal determined by the base station control signal determining means to the base station group in soft hand over or regularly transmitting a primary base station information detected by the primary base station detecting means as the transmission power control signal to the base station group in soft hand over.

According to the thirteenth aspect of the present invention, a base station in a code division multi access cellular mobile ratio communication system announcing a unique pilot signal and is capable of simultaneously establishing. connection with a mobile station together with other base stations in a soft hand over base station group consisted of some of base stations, comprising:

control signal receiving means for receiving, a transmission power control signal from the mobile station; and transmission power control means for increasing and decreasing a transmission power for current and subsequent timing according to the transmission power control signal when a primary base station information is contained in the transmission power control signal and the primary base station information indicates the base station information of own station and setting the transmission power to a minimum transmission power for current and subsequent timing when the primary base station information is contained in the transmission power control signal and the primary base station information does not indicate the base station information of own station.

According to the fourteenth aspect of the present invention, a mobile communication system comprises:

a mobile station; and a plurality of base stations adapted for communication with the mobile station, one or more base stations having propagation loss in communication with the mobile station smaller than a predetermined threshold value during soft hand over being selected as communication stations, transmission power of a base station group of the base stations other than those selected as the communication stations being controlled for sequentially attenuating toward a predetermined minimum power with a given attenuation amount.

According to the fifteenth aspect of the present invention, a cellular mobile communication system including a plurality of base stations and mobile station, comprises:

base station number assigning means for temporarily assigning base station numbers for a plurality of base stations in soft hand over with the mobile station;

base station selecting means for selecting the base station which transmits a pilot signal received by the mobile station at a maximum reception intensity among pilot signals transmitted from the base station in soft hand over;

transmission power control signal transmitting means for using a base station number of the selected base station as a transmission power control signal to be transmitted to the base station group in soft hand over from the mobile station; and transmission power control means for controlling the transmission power of the base station on the basis of the transmission power control signal, the transmission power of the base station other than the selected base station being controlled for sequentially attenuating toward a predetermined minimum power with a given attenuation amount.

According to the sixteenth aspect of the present invention, a communication control method in a cellular mobile communication system including a plurality of base stations and mobile station, comprises:

base station number assigning step of temporarily assigning base station numbers for a plurality of base stations in soft hand over with the mobile station;

base station selecting step of selecting the base station which transmits a pilot signal received by the mobile station at a maximum reception intensity among pilot signals transmitted from the base station in soft hand over;

transmission power control signal transmitting step of using a base station number of the selected base station as a transmission power control signal to be transmitted to the base station group in soft hand over from the mobile station; and transmission power control step of controlling the transmission power of the base station on the basis of the transmission power control signal, the transmission power of the base station other than the selected base station being controlled for sequentially attenuating toward a predetermined minimum power with a given attenuation amount.

According to the seventeenth aspect of the present invention, a mobile station in a code division multi access cellular mobile radio communication system comprising a plurality of base stations respectively announcing unique pilot signals and capable of simultaneously establishing connection with a soft hand over base station group consisted of some of base stations out of the base stations in the system, comprising:

primary base station determining means for determining a primary base station having a minimum propagation loss during soft hand over; and transmitting means for sequentially commanding attenuation control of transmission power for the base stations in the soft hand over base station group other than the primary base station, with a given attenuation amount.

According to the eighteenth aspect of the present invention, a base station in a cellular mobile communication system temporarily assigned the base station number by a mobile station in soft hand over with the mobile station, comprises:

means for transmitting a pilot signal;

judgment means for receiving a transmission power control signal including a base station number selected as base station which transmits a pilot signal received by the mobile station at a maximum reception intensity among pilot signals transmitted from the base station in soft hand over and making judgment whether the base station number is consistent with a number assigned to own station or not; and transmission power control means for performing sequential attenuation control of the transmission power with a given attenuation amount when the base station number and the number of own station are inconsistent with each other.

With the present invention set forth above, increasing of interference in the down link due to plural base stations transmission causing problem in soft hand over, can be avoided by restricting transmission power of the base stations other than the primary base stations upon soft hand over. On the other hand, under the premise of application of soft hand over, connection between the mobile station and the minimum propagation loss base station can be assured under presence of hand over control delay. Accordingly, excessive radiation of the transmission power of the former base stations before hand over due to hand over control delay to be a problem in hand over.

Also, by moderately attenuating the transmission power instead of abruptly restricting upon restricting the transmission power of the base stations other than the base station having small propagation loss with the mobile station among the base station group during soft hand over, abrupt lowering of the desired signal reception intensity in the mobile station is not caused even when error in selection of the base station is caused. Thus, significant degradation of reception quality as observed in the conventional system shown in FIG. 34 can be prevented.

Furthermore, by making the mobile station to selected one or several base stations having small propagation loss with the mobile station, namely small reception error of the transmission power control signal as being assigned for transmission, transmission with inappropriate transmission power due to reception error of the transmission power control signal can be successfully avoided. Furthermore, the value of virtual base station transmission power is indicative of a set target value of the transmission output value of the base station after communication with minimum transmission power without selection of own base station for a while. By this, upon switching of the communication station of the mobile station, degradation of quality and excessive quality can be prevented.

On the other hand, instead of all base stations during soft hand over, a part of the base stations are assigned for transmission to the mobile station to successfully reduce interference of the down link. As a result, high down link capacity can be achieved.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 25 is an illustration showing an example of a transmission power control symbol Spct and an actual bit string indicative thereof;

FIG. 34 is an illustration showing examples of variation of the transmission power PT-A and PT-B in time in each base station when the prior art is applied upon soft hand over between the mobile station and two base stations BS-A and BS-B.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

One embodiment of a base station transmission power control system, a mobile station and a base station according to the present invention will be discussed hereinafter.

Figure 1:
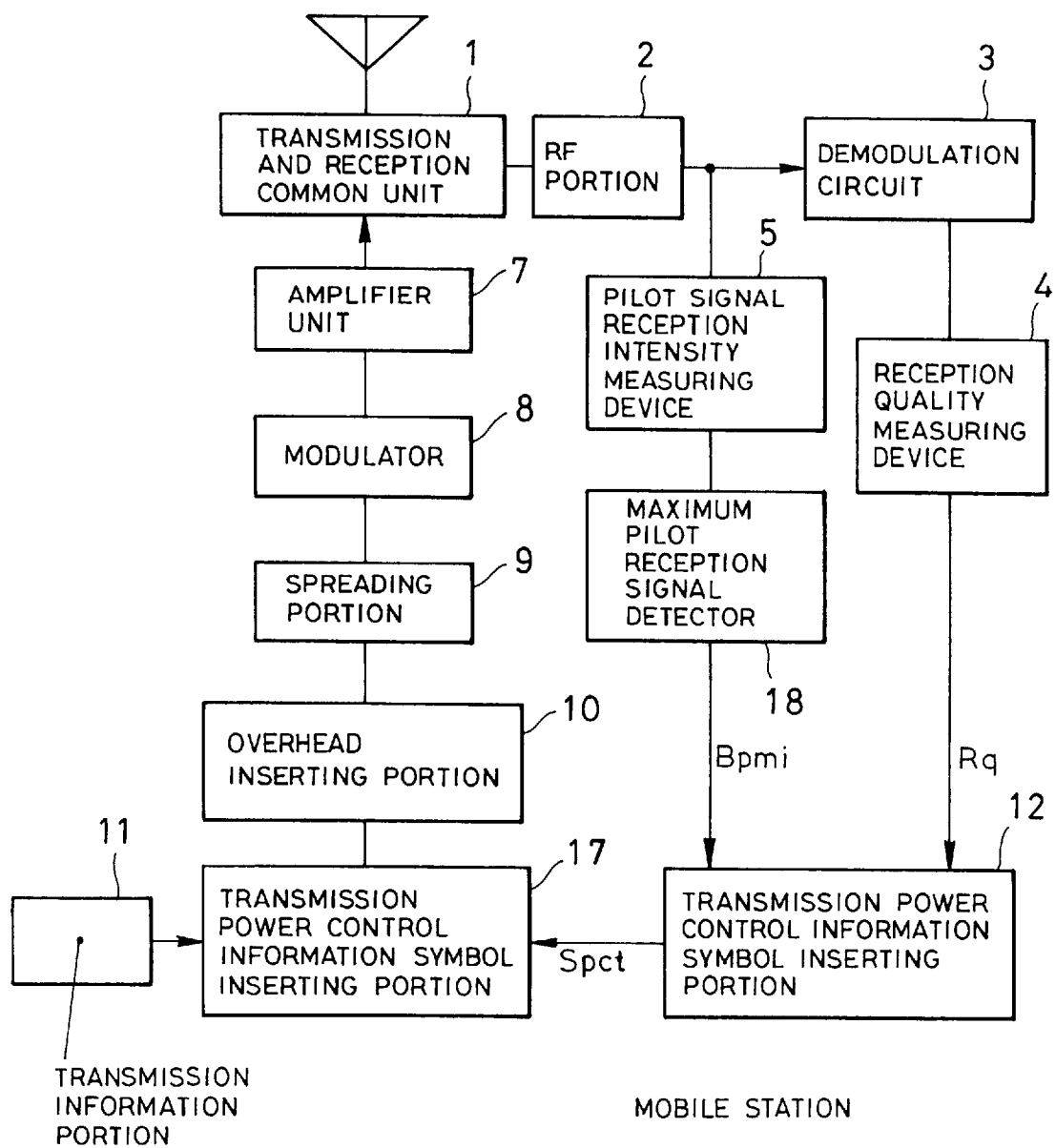
FIG. 1 is an illustration showing an embodiment of a mobile station according to the present invention.

FIG. 1 is an illustration showing a construction of the shown embodiment of the mobile station. The mobile station is constructed with an RF portion 2 performing a reception process of a signal received from the base station, a demodulation circuit 3, a reception quality measuring device 4 detecting a reception quality of a received signal and a maximum pilot reception signal, a pilot signal reception intensity measuring device 5, a maximum pilot reception signal detector 18, a transmission power control information symbol generating portion 12 generating a transmission power control information of the base station to be inserted in a signal to be transmitted to the base station, a transmission information portion 11 outputting a transmission signal, a transmission power control information symbol inserting portion 17 inserting the transmission power control information symbol in the transmission signal, a spreading portion 9 inserting necessary overhead information, performing modulation process and transmitting, a modulator 8, an amplifier device 7 and a transmission/reception common unit I.

A transmission signal transmitted from the base station is received via the transmission/reception common unit 1, the RF portion 2 and the demodulation circuit 3 of the mobile station. A reception quality Rq [dB] of the transmission signal is measured by the reception quality measuring device 4. On the other hand, a pilot signal radiated from each base station and included in the output of the RF portion 2 is received the maximum pilot reception signal detector 18 via the pilot signal reception intensity measuring device 5. In the maximum pilot reception signal detector 18, an index Bpmi of the base station having the minimum propagation loss and transmitting the pilot signal having the maximum reception power, is detected. Here, as the base station index, when number of base stations of the maximum soft hand over, mutually distinct numbers among 1 to n are assigned for respective base stations associated with soft hand over.

The reception quality Rq and the minimum propagation loss base station index Bpmi are input to the transmission power control information symbol generating portion 12. In the transmission power control information symbol generating portion 12, a transmission power control information symbol Spct designating a transmission signal level for the base station is generated. The transmission power control information symbol Spct is inserted in the transmission signal output from the transmission information portion 11 in the transmission power control information symbol inserting portion 17. Furthermore, the transmission signal of output of the overhead inserting portion 10 is inserted an overhead information in the overhead inserting portion 10. The transmission signal containing the transmission information, the transmission power control information and the overhead information is transmitted toward the base station via the spreading portion 9, the modulator 8, the amplifier device 7 and the transmission/reception common unit 1.

Figure 2:
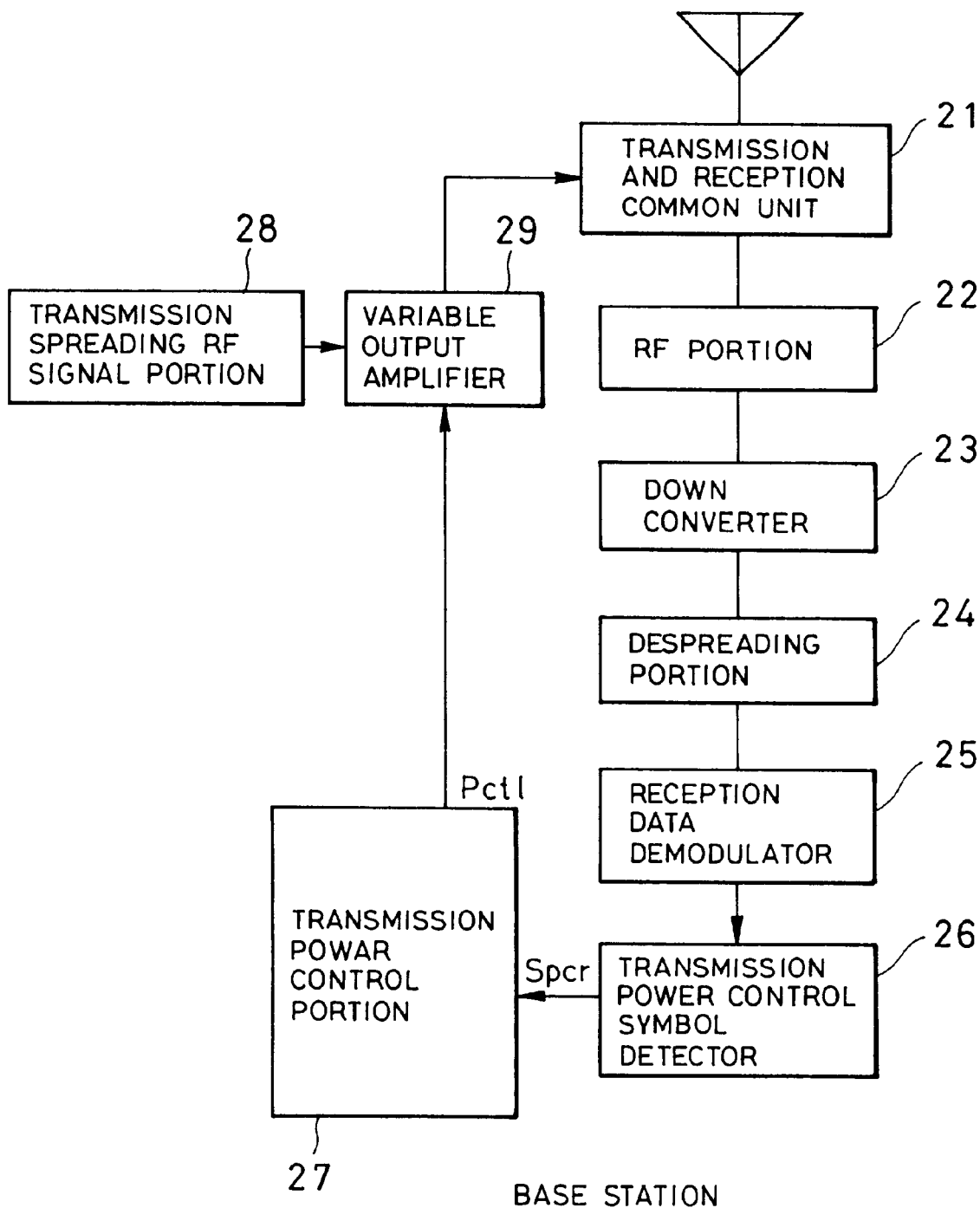
FIG. 2 is an illustration showing an embodiment of a base station according to the present invention.

FIG. 2 is an illustration showing a construction of the shown embodiment of the base station. The base station performs demodulation process or so forth of the signal received from the mobile station. The base station is constructed with an RF portion 22, a frequency down converter 23, a despreading portion 24, a reception data demodulator 25, a transmission power control symbol detector 26 extracting the transmission power control information determining an output level of the RF signal transmitted from the base station from the reception signal, a transmission power control portion 27, a transmission spreading RF signal portion 28 outputting the transmission signal containing the pilot signal to be transmitted to the mobile station, a variable output amplifier 29 controlling output level of the transmission signal on the basis of the transmission power control information and a transmission/reception common unit 21.

The transmission signal containing the transmission power control information transmitted from the mobile station is input to the transmission power control symbol detector 26 via the transmission/reception common unit 21, the RF portion 22, the frequency down converter 23, the despreading portion 24 and the reception data demodulator 25. The transmission power control symbol detector 26 detects a transmission power control information Sper. The transmission power control information Spcr is input to the transmission power control portion 27. Then, the transmission power control portion 27 sets the output level [dBW] of the variable output amplifier 29 at a control value Pctl on the basis of the transmission power control information Spcr.

The transmission signal to the mobile station output from the transmission spreading RF signal portion 28 is amplified by the variable output amplifier 29 which is controlled by the signal Pctl and is transmitted toward the mobile station via the transmission/reception common unit 21.

Figure 3:
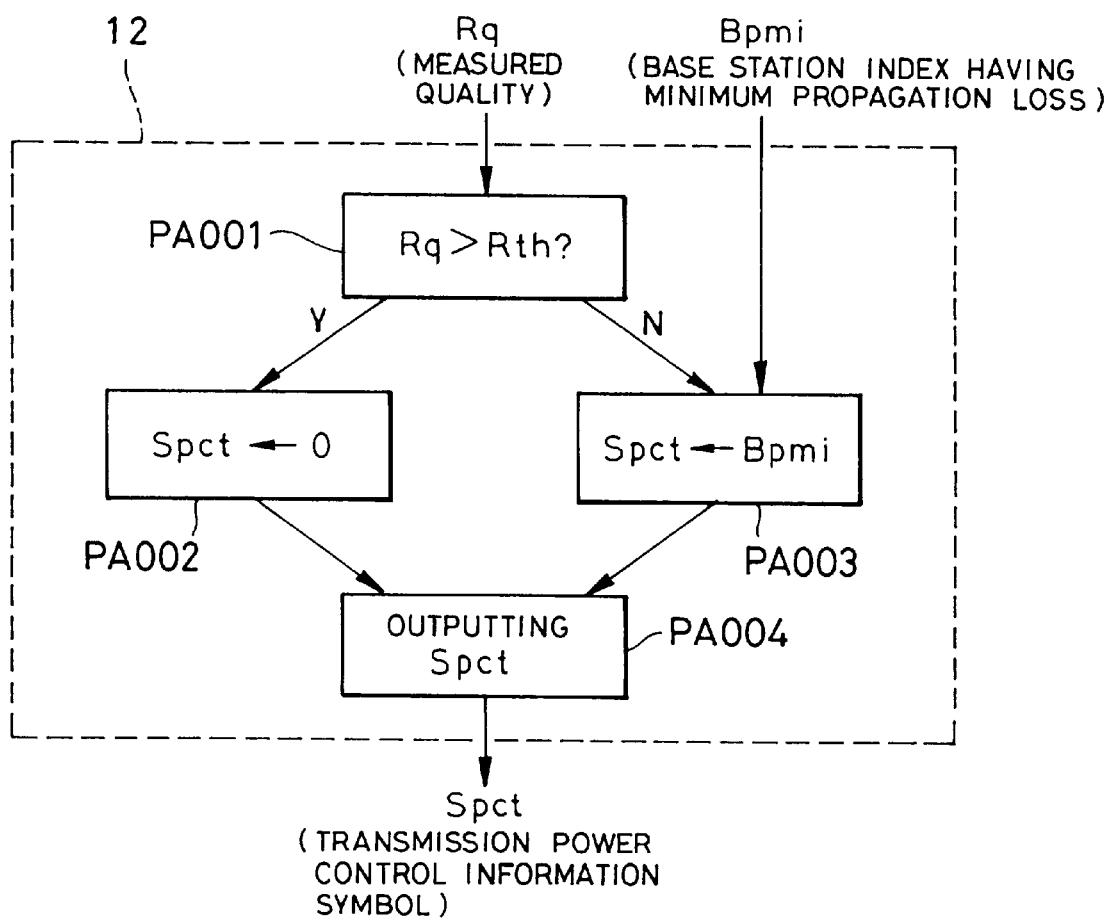
FIG. 3 is an illustration showing an operation of a transmission power control information symbol generating portion in the shown embodiment of the mobile station.
Figure 4:
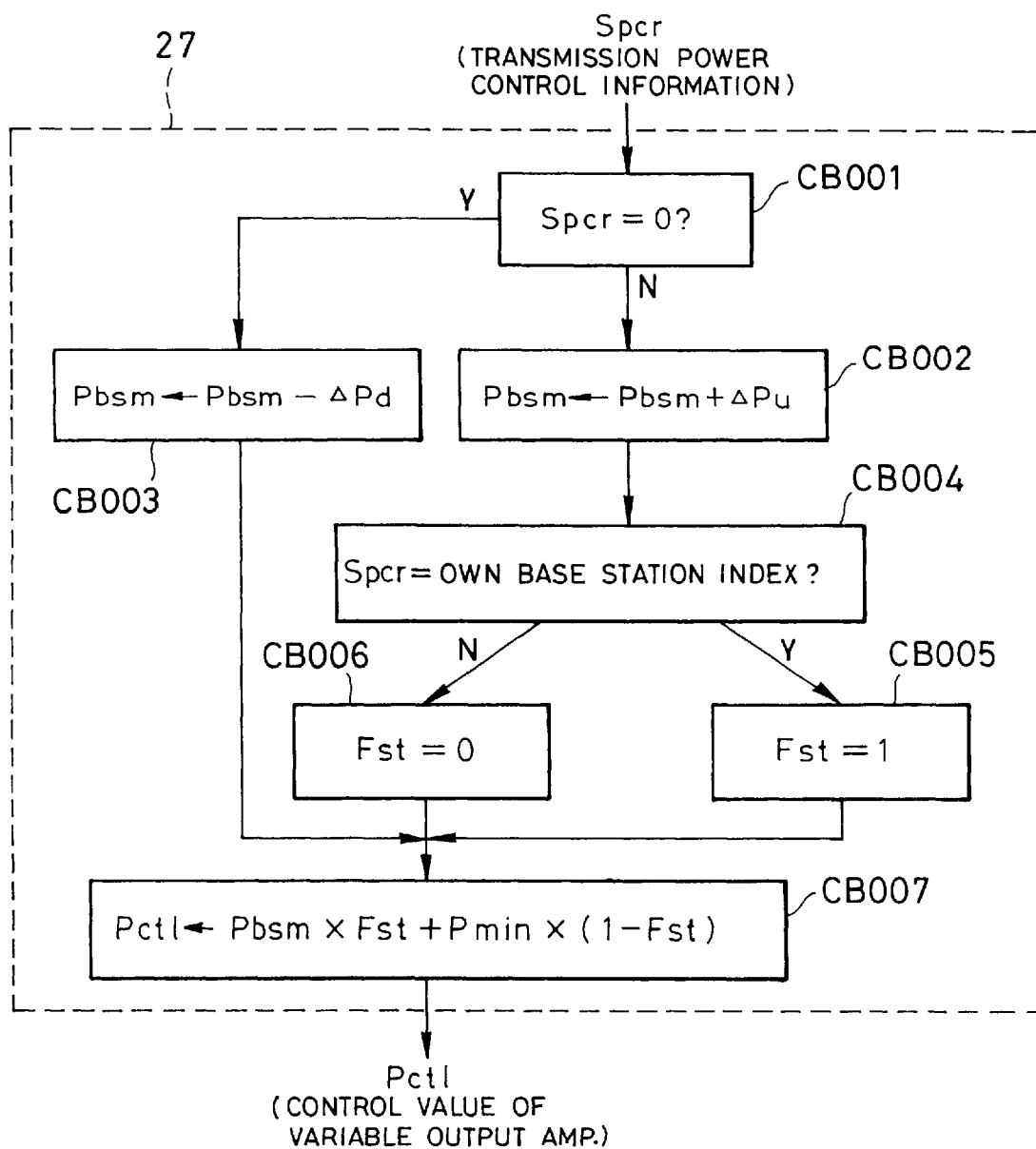
FIG. 4 is an illustration showing an operation of a transmission power control portion in the base station corresponding to the mobile station shown in FIG. 3.

FIGS. 3 and 4 are flow diagrams showing one embodiment of signal processing of the transmission power control information symbol generating portion 12 of the mobile station and the transmission power control portion 27 of the base station in the base station transmission power control system according to the present invention.

At first, discussion will be given for operation of the transmission power control information symbol generating portion 12 in the mobile station shown in FIG. 3. The reception quality Rq measured in the mobile station is compared with a quality threshold value Rth [dB] in control step PA001. As a result of comparison, if Rq>Rth, the transmission power control information symbol Spct is set to 0 at control step PA002. Otherwise, Spct is set equal to Bpmi at control step PA003 to output any one of the transmission power control information symbols Spct is output at control step PA004.

Next, discussion will be given for operation of the transmission power control portion 27 in the base station shown in FIG. 4. The transmission power control information Spcr detected by the transmission power control symbol detector 26 is judged whether it is set to 0 at control step CB001. If the transmission power control information Spcr is not 0, a transmission power control amount $\Delta Pu$ [dB] is added to a current base station transmission power Pbsm [dBW] directed toward the mobile station which transmits the transmission power control information Spcr, at control step CB002. On the other hand, if the transmission power control information Spcr is 0, a transmission power control amount (power attenuation amount) $\Delta Pd$ [dB] is subtracted from the base station transmission power Pbsm at control step CB003.

When $\Delta Pu$ is added to the base station transmission power Pbsm is added at the control step CB002, check is performed whether the transmission power control information Spcr and the index number of the own base station are consistent with each other or not at step CB004. If the transmission power control information Spcr and the index number of the own base station are consistent with each other, transmission flag Fst is set to 1 at control step CB005. On the other hand, if the transmission power control information Spcr and the index number of the own base station are not consistent with each other, the transmission flag Fst is set to 0 at control step CB006. Here, the initial value of the transmission flag Fst is 0, and is constantly held until being varied subsequently.

When $\Delta Pu$ is subtracted from the current base station transmission power Pbsm at control step CB003, the value of the transmission flag Fst is held as the preceding value.

Then, at control step CB007, the control value Pctl [dBW] of the variable output amplifier 29 shown in FIG. 2 is derived through the following formula:

$$Pctl \rightarrow Pbsm \times Fst + Pmin \times (1-Fst) \quad (1)$$

wherein Pmin [dBW] represents a minimum transmission power in the base station.

The control value Pctl obtained through the foregoing formula (1) at control step CB007 is output to the variable output amplifier 29. Then, the base station transmission power is controlled to the control value Pctl [dBW] by the variable output amplifier 29.

Operation of the base station transmission power control during soft hand over in the shown embodiment of the base station transmission power control system will be discussed with reference to FIGS. 5, 6 and 7.

Figure 5:
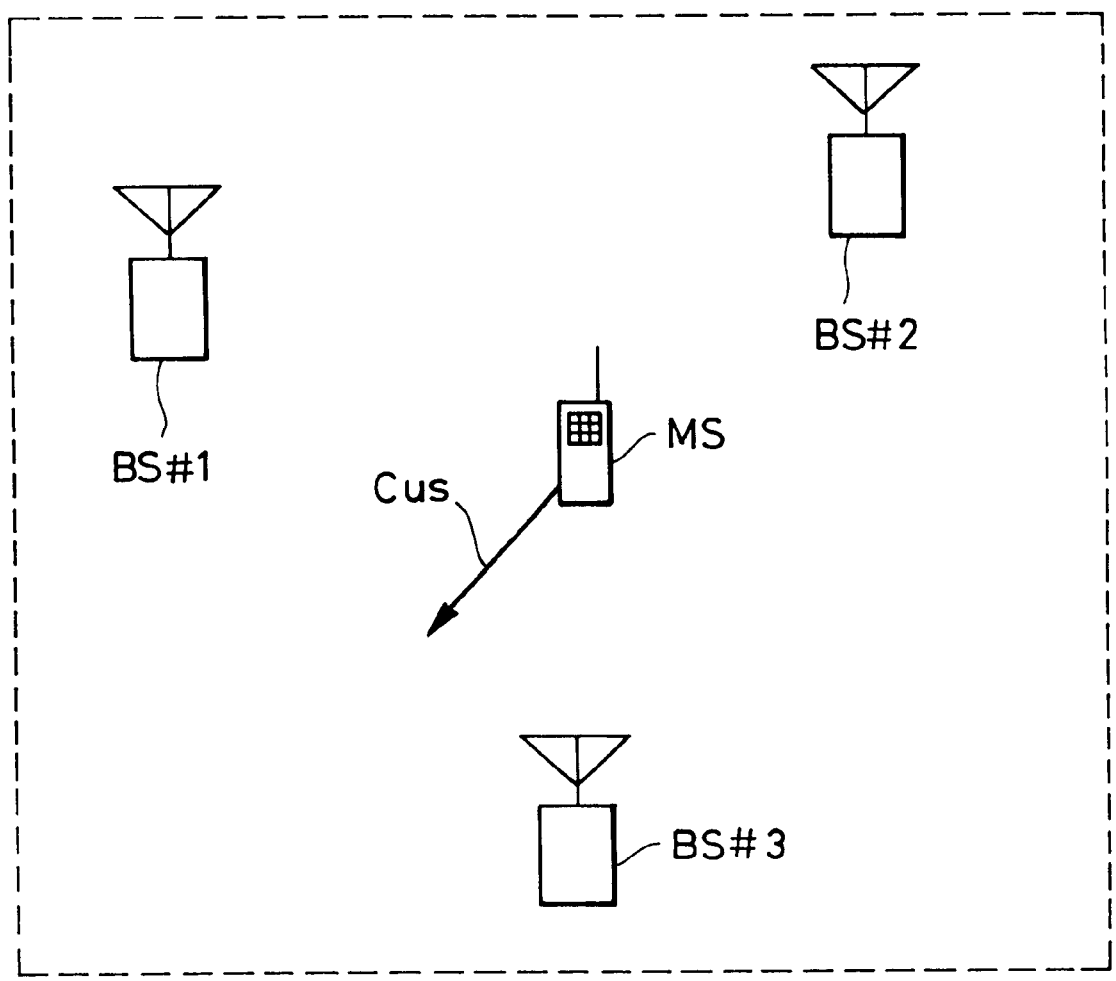
FIG. 5 is an illustration showing a cellular mobile station arrangement for explaining soft hand over of the present invention.

As shown in FIG. 5, the mobile station MS in motion in a Cus direction is assumed that is performing soft hand over with three base stations BS#1, BS#2 and BS#3. The mobile station MS has the construction shown in FIG. 1 and constantly transmits the transmission power control information symbol Spct toward the base stations BS#1 to BS#3 in the method shown in FIG. 3. On the other hand, each of the base stations BS#1 to BS#3 has a construction shown in FIG. 2. The output if the variable output amplifier 29 is controlled to the control value Pctl in the method shown in FIG. 4. Here, the power increasing amount ΔPu and the power attenuation amount ΔPd become equal value.

Figure 6:
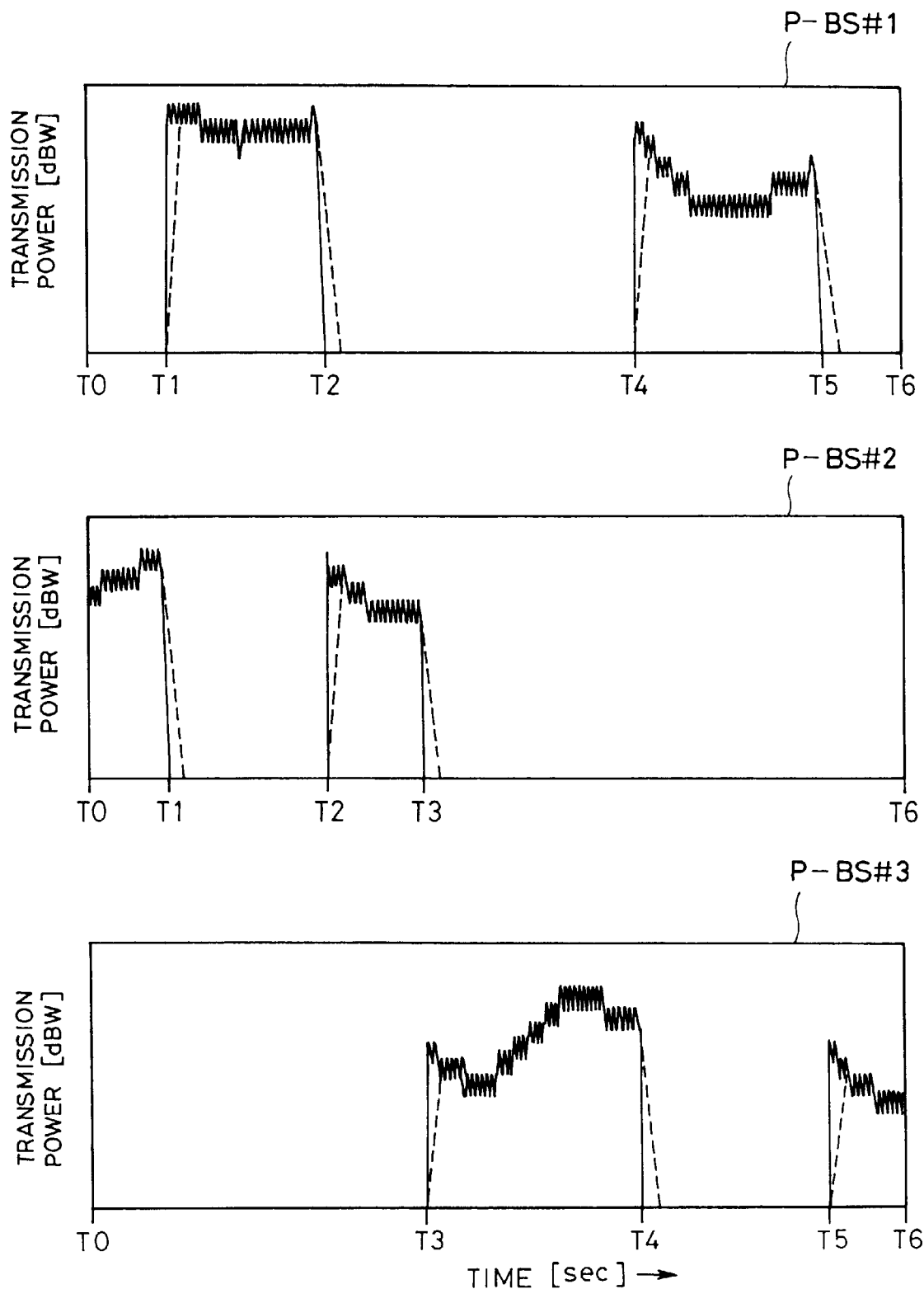
FIG. 6 is an illustration showing variation of transmission power of the base station in time according to the present invention.

When the shown embodiment of the transmission power control method is applied, variation of the transmission power in time of the base stations BS#1 to BS#3 toward the mobile station MS is as illustrated by solid link in FIG. 6. P-BS#1, P-BS#2 and P-BS#3 respectively show variation of the transmission power in time of respective base stations BS#1, BS#2 and BS#3. In FIG. 6, the vertical axis represents the base station transmission power [dBW] and the horizontal axis represents a time [sec].

In the shown embodiment of the transmission power control method as illustrated in the time dependent variation P-BS#2 shown by the solid link in FIG. 6, during a period from a time T0 [sec] to a time T1 (secl, only base station BS#2 performs transmission and base stations BS#1 and BS#3 perform transmission at minimum transmission power. On the other hand, during a period from the time T1 [sec] to T2 [sec], only base station BS#1 performs transmission as shown by time dependent variation P-BS#1, and the base stations BS2 and BS3 perform transmission at minimum transmission power.

By the shown embodiment of the transmission power control method, the primary base station, in which the reception level of the pilot signal received by the mobile station becomes constantly minimum propagation loss, is selected depending upon the reception level of the pilot signal received by the mobile station. Then, only primary base station transmits the transmission wave and other base stations are restricted output of the transmission wave for suppressing increasing of interference. This nominally equivalent to the condition where instant hard hand over having no hand over control delay is realized.

Figure 7:
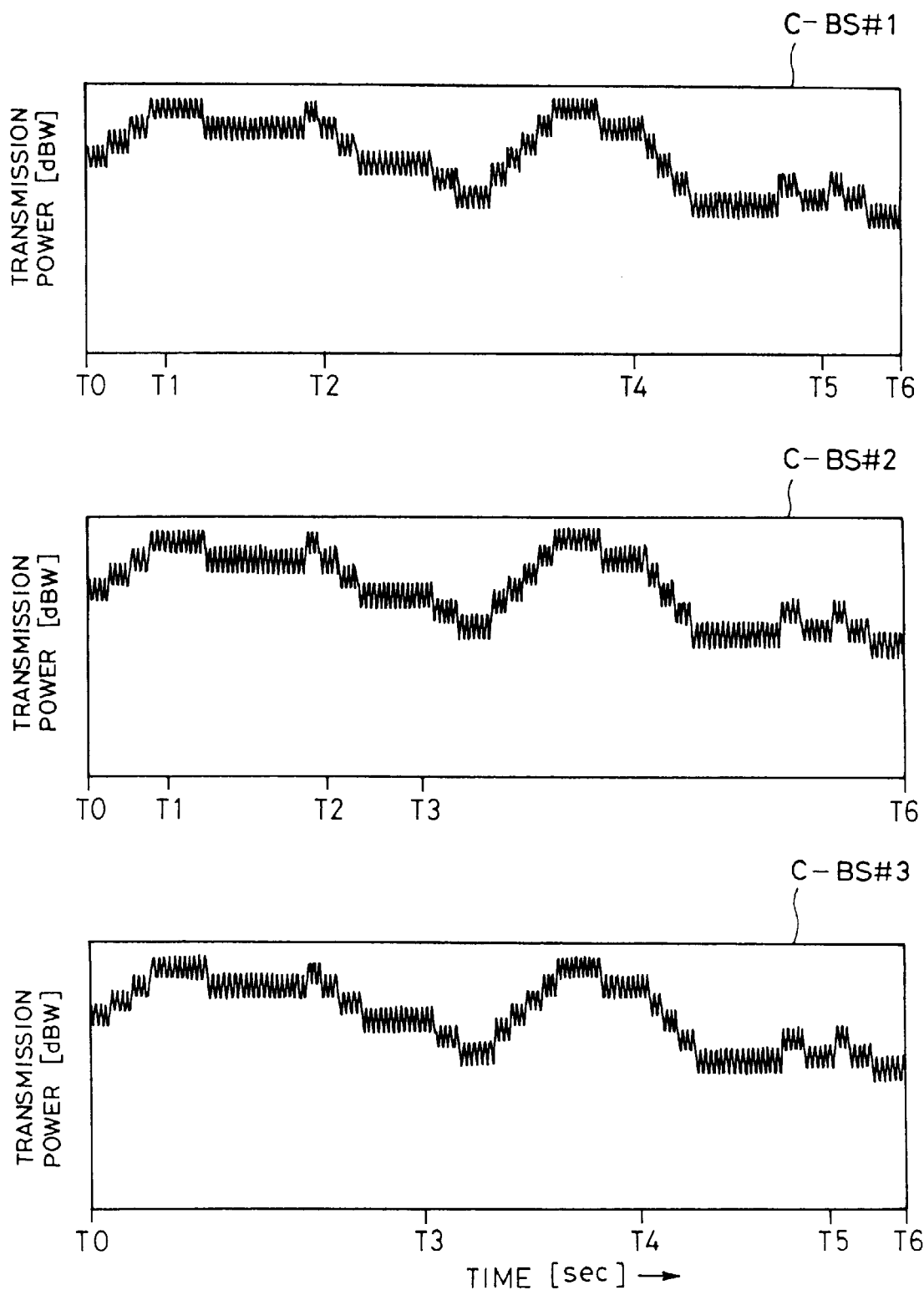
FIG. 7 is an illustration showing variation of transmission power of the base station in time in the prior art.
Figure 30:
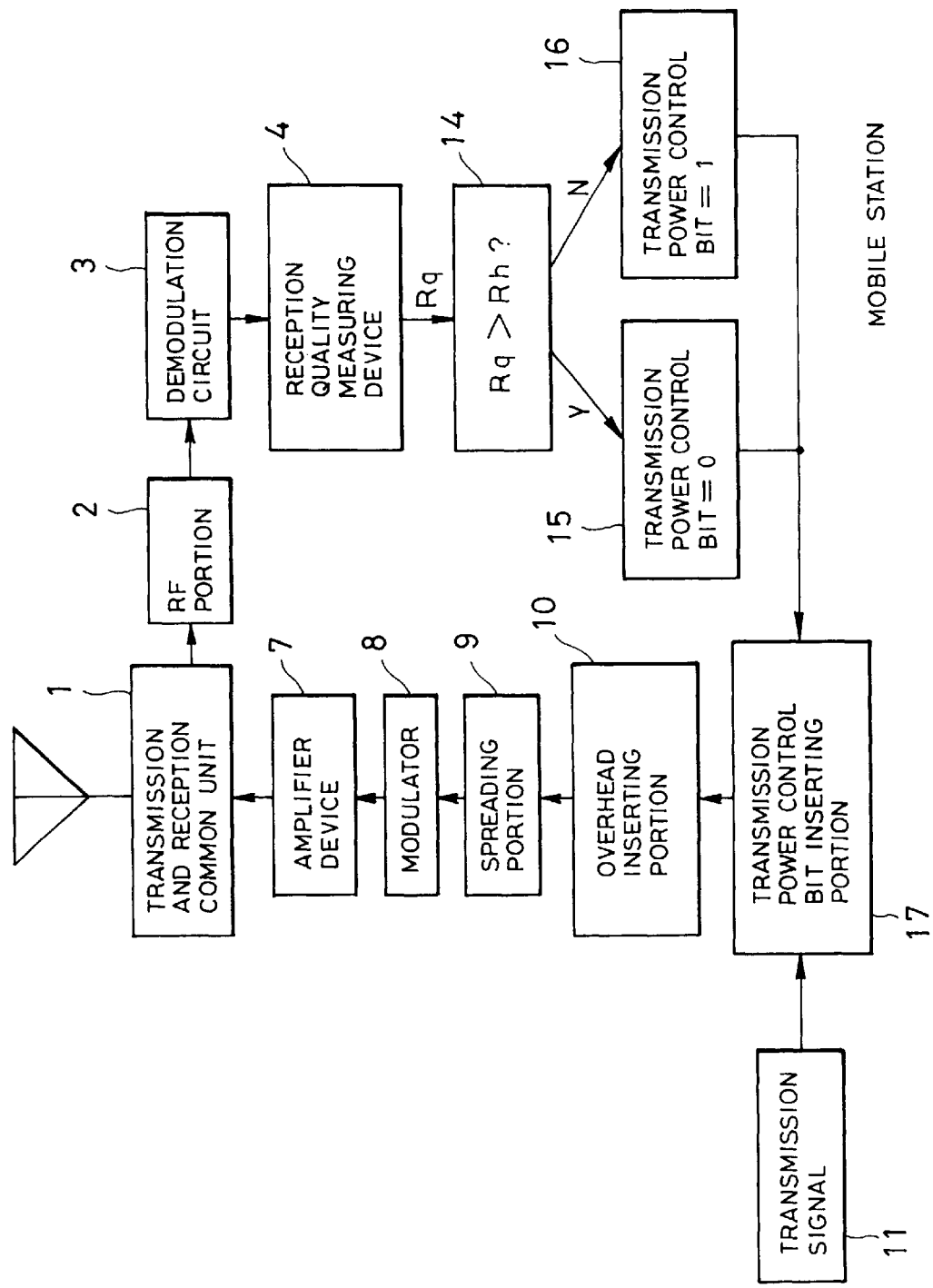
FIG. 30 is a block diagram of the conventional mobile station.
Figure 31:
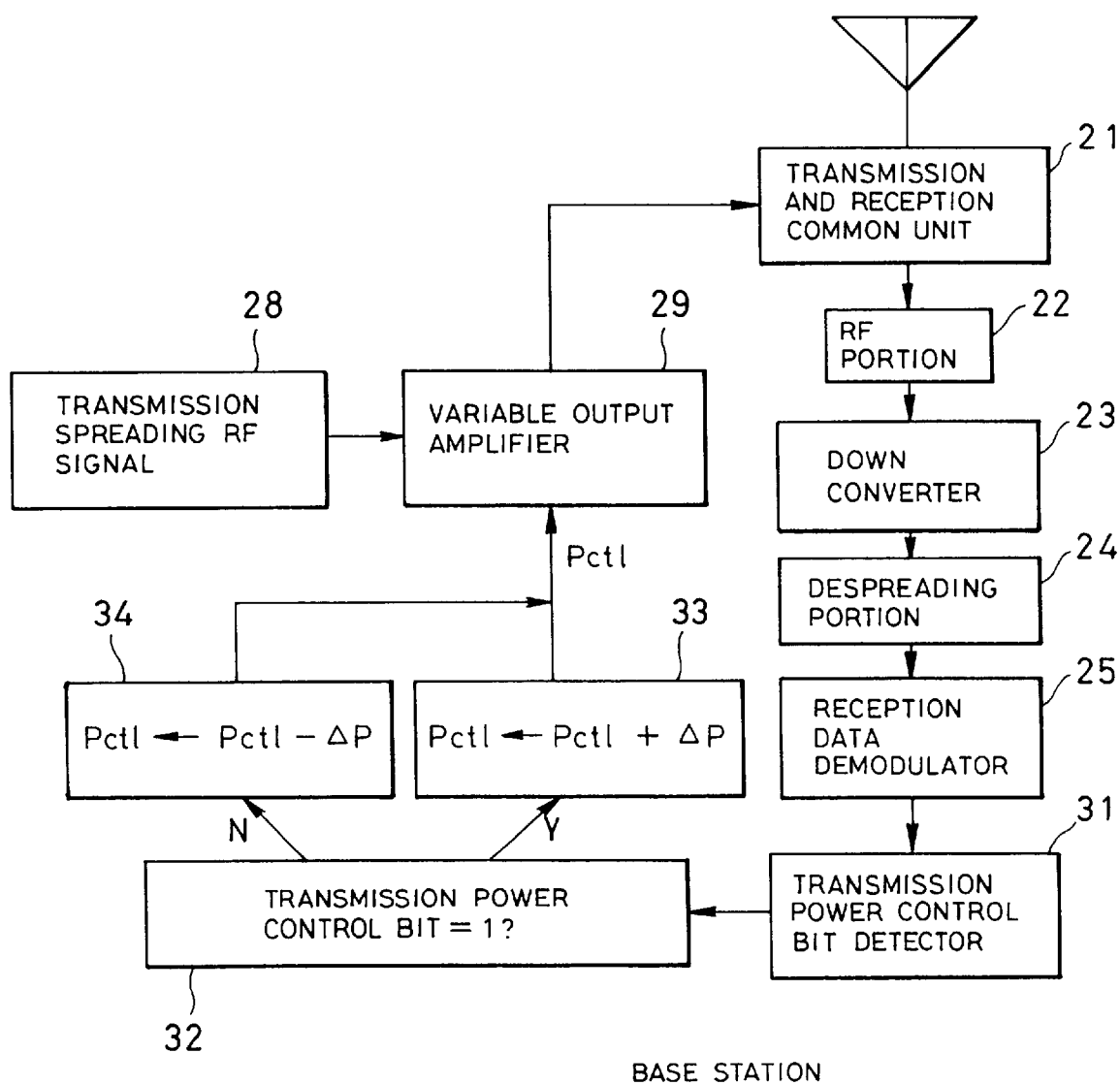
FIG. 31 is a block diagram showing the conventional base station.
Figure 32:
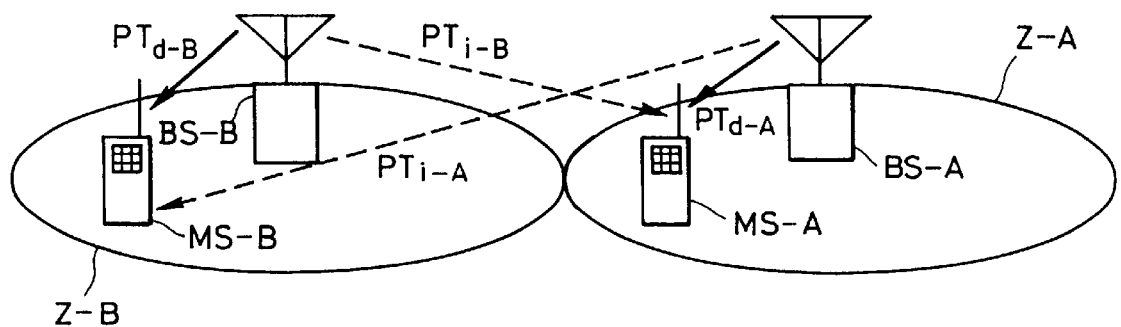
FIG. 32 is an illustration showing a signal received by the mobile station in the case where the soft hand over is not performed.
Figure 33:
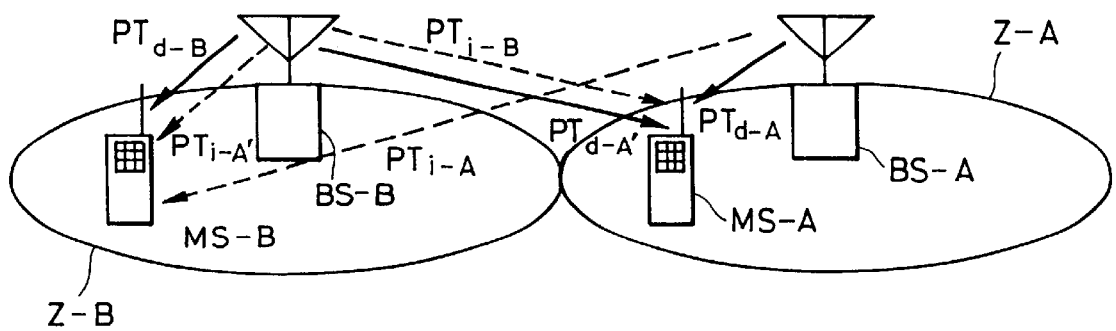
FIG. 33 is an illustration showing a signal received by the mobile station when the soft hand over is performed.

On the other hand, FIG. 7 shows the base station transmission power in the case where the conventional transmission power control shown in FIGS. 30 and 31 is applied. C-BS#1, C-BS#2 and C-BS#3 represent time dependent variation of the transmission power of respective base stations BS#1, BS#2 and BS#3. In the transmission power control in the conventional method, all of the three base stations transmits the equal transmission power toward the mobile station MS as shown in FIG. 71 high interference in comparison with the transmission power control method according to the present invention, can be caused in the peripheral mobile station.

On the other hand, in the sequential base station transmission power control according to designation of increasing or decreasing of the power from the mobile station, error should be caused in increasing and decreasing control of the base station transmission power by the reception error of the control signal.

In the transmission power control according to the present invention, even when error is caused in increasing and decreasing control of the base station transmission power, for example, since the transmission power is restricted for the base stations other than the primary base station, influence an be made small.

Next, another embodiment of the base station transmission power control system, the mobile station and the base stations according to the present invention will be discussed.

Figure 8:
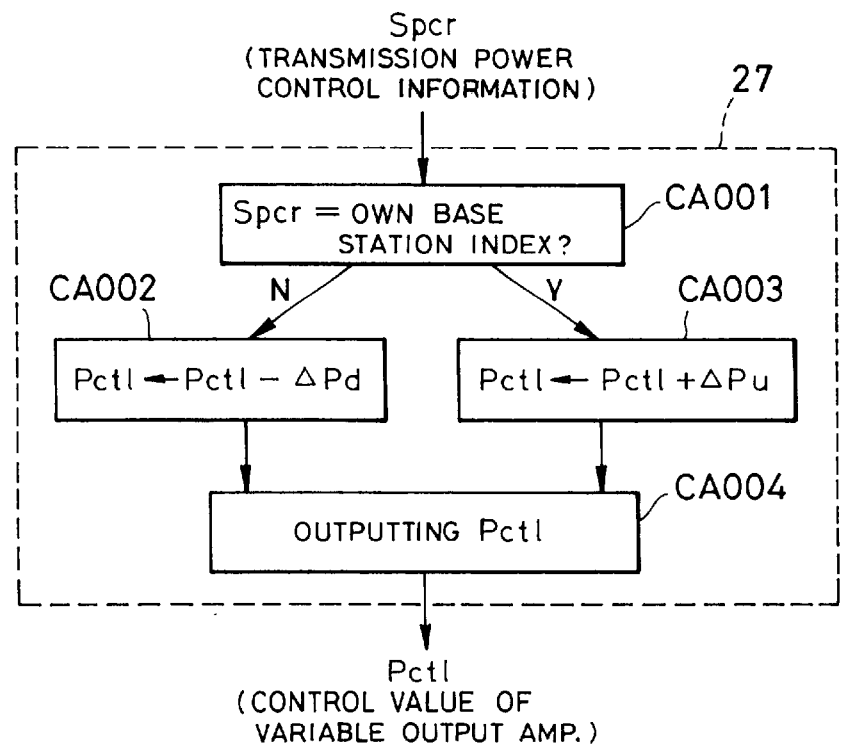
FIG. 8 is an illustration showing an operation of the transmission power control portion of another embodiment of the base station corresponding to the mobile station shown in FIG. 4.

FIG. 8 shows a construction of another embodiment of the base station according to the present invention, in which a different construction of the transmission power control portion 27 in the base station discussed with reference to FIG. 4 is illustrated. Namely, FIG. 8 illustrates different construction of the transmission power control portion 27 corresponding to the transmission power control information symbol generating portion 12 shown in FIG. 3.

In the shown embodiment, increasing and decreasing control of the transmission power of a given amount is performed depending upon whether the transmission power control information symbol Spcr from the mobile station is matched with the index number of own base station or not. Variation of the transmission power of the base station by switching of the primary base station can be made as moderate time dependent variation as shown by dotted link in FIG. 6.

In the transmission power control symbol detector 26 of the base station shown in FIG. 2, concerning the detected transmission power control information symbol Spcr, the transmission power control information symbol Spcr and the index number of own base station are compared at control step CA001. If the transmission power control information symbol Spcr and the index number of own base station are equal to each other, the power increasing amount ΔPu [dB] is added to the control value Pctl [dBW] of the output of the variable output amplifier 29 at control step CA003. If the transmission power control information symbol Spcr and the index number of own base station are not equal to each other, process to subtract the power attenuation amount ΔAd [dB] from the control value Pctl [dBW] at step CA002, is performed. The resultant value Pctl [dBW] of addition or subtraction is output toward the variable output amplifier 29 at step CA004. In the base station of the shown embodiment, the base station transmission power control system according to the present invention which enables soft hand over operation with the mobile station having the transmission power control information symbol generating portion 12 shown in FIG. 3, is incorporated.

Also, as a further embodiment of the mobile station and the base station according to the present invention, in which the transmission power control information symbol generating portion 12 and the transmission power control portion 27 having constructions different from the former embodiment, will be discussed with reference to FIGS. 9 and 10. In the shown embodiment, the mobile station manages the base station transmission power value to be transmitted from the primary base station to constantly transmit the base station transmission power value and the minimum propagation loss base station index. In the transmission power control information symbol generating portion 12 shown in FIG. 9, setting for reflecting a difference between the reception quality Rq and the given quality threshold value Rth in the base station transmission power value is performed.

At first, discussion will be given for the transmission power control information symbol generating portion 12.

Figure 9:
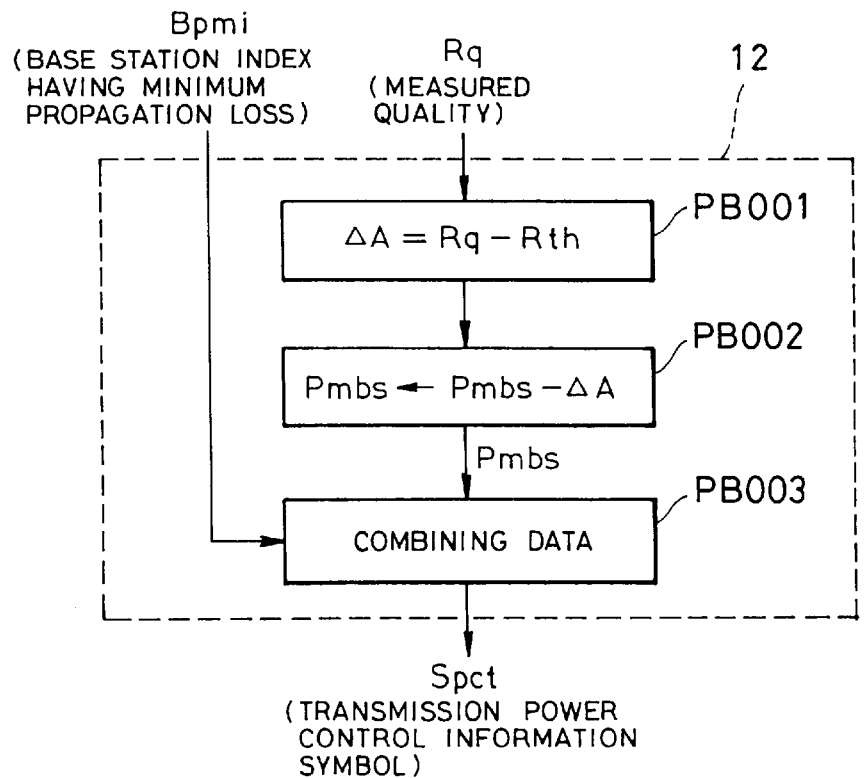
FIG. 9 is an illustration showing an operation of the transmission power control information symbol generating portion of another embodiment of the mobile station according to the present invention.

FIG. 9 is an illustration showing a construction of the transmission power control information symbol generating portion 12 of the shown embodiment of the mobile station.

At control step PB001, a value derived by subtracting the quality threshold value Rth from the reception quality Rq [dB] measured in the mobile station is replaced with the control amount ΔA [dB]. At control step PB002, ΔA is subtracted from the base station transmission power mobile station management value Pmbs [dBW]. At control step PB003, by combining the value of the base station transmission power mobile station management value Pmbs and the minimum propagation loss base station index Bpmi, the transmission power control information symbol Spct is generated. Then, the transmission power control information symbol Spct is output to the transmission power control information symbol inserting portion 17 shown in FIG. 1.

Next, discussion will be given for the transmission power control portion 27 in the base station corresponding to the mobile station.

Figure 10:
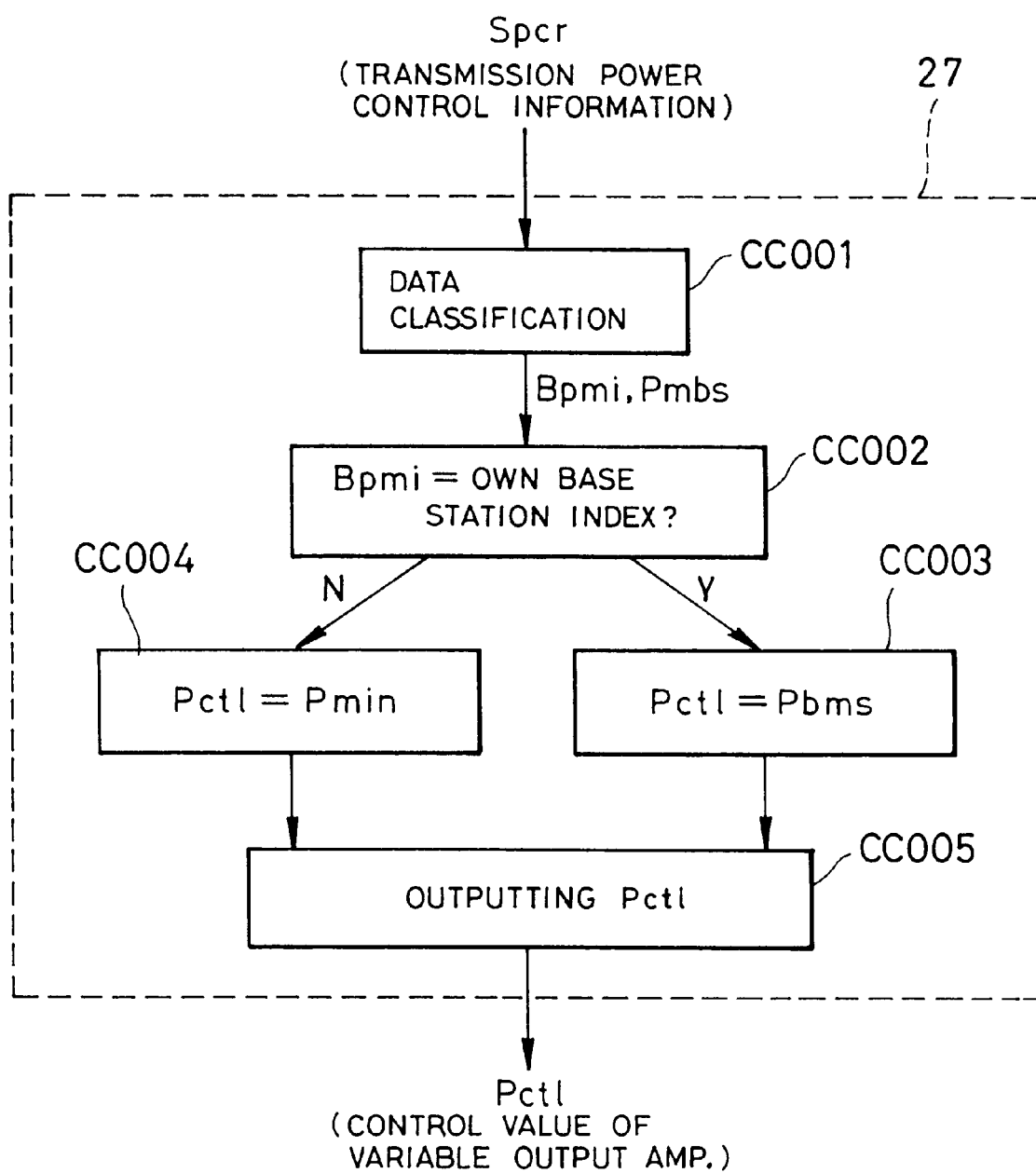
FIG. 10 is an illustration showing an operation of the transmission power control portion of another embodiment of the base station corresponding to the mobile station shown in FIG. 9.

FIG. 10 is an illustration showing a construction of the transmission power control portion 27 of the base station corresponding to the transmission power control information symbol generating portion 12 shown in FIG. 9.

At first, at control step CC001, the minimum propagation loss base station index Bpmi and the base station transmission power mobile station management value Pmbs are separated. Then, at control step CC002, check is performed whether the minimum propagation loss base station index Bpmi and the own base station index are equal to each other or not. If the minimum propagation loss base station index Bpmi and the own base station index are consistent, the control value Pctl of the variable output amplifier 29 is set as the base station transmission power mobile station management value Pmbs, at control step CC003. Otherwise, the control value Pctl is set at the minimum base station transmission power Pmin at control step CC004. Subsequently, the control value Pctl is output to the variable output amplifier 29 at control step CC005.

By the shown embodiment, since sequential transmission power control according to power increasing and decreasing command from the mobile station is not performed, a problem of accumulation of error in increasing and decreasing control of the base station transmission power which should be caused in the former embodiment, can be avoided.

Figure 11:
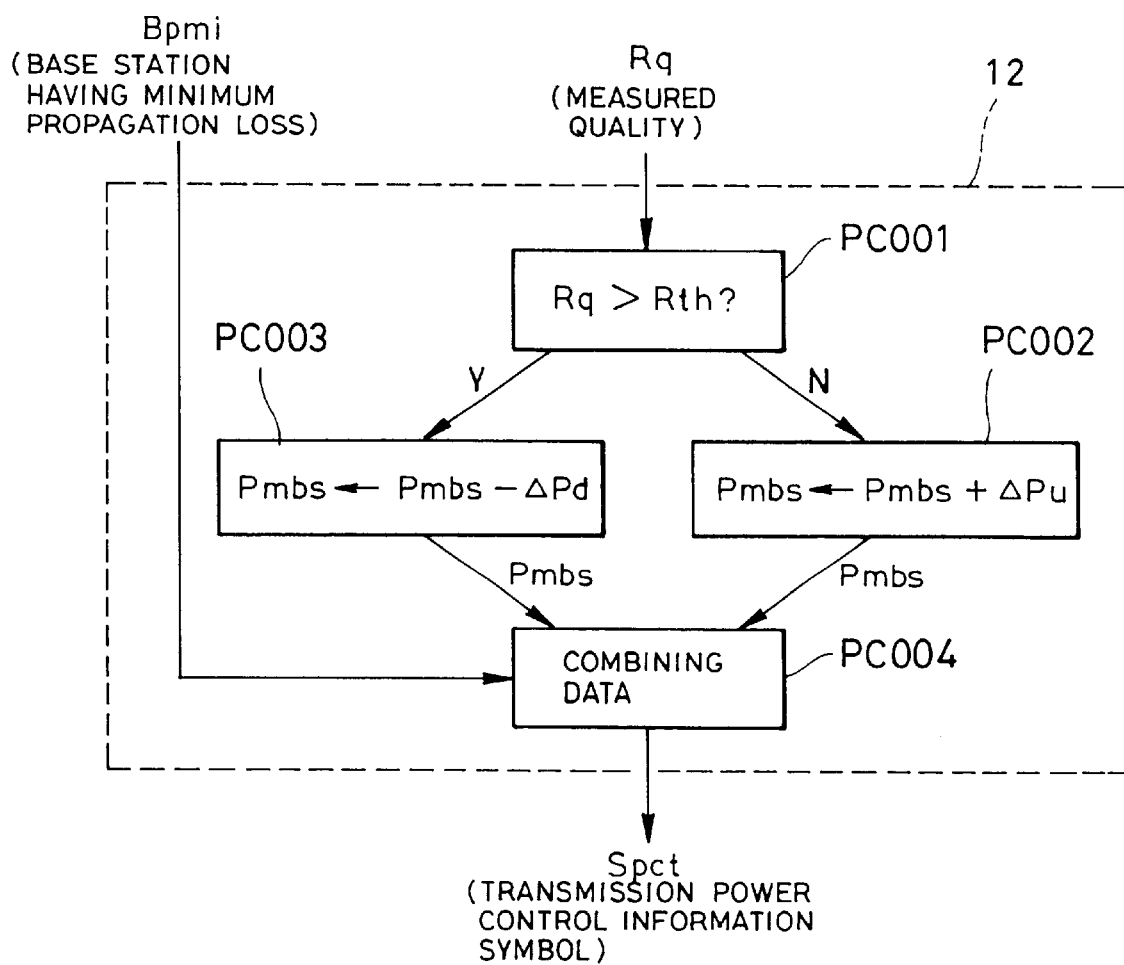
FIG. 11 is an illustration showing an operation of the transmission power control information symbol generating portion of another embodiment of the mobile station of FIG. 9.

Further different construction of the transmission power control symbol generating portion 12 in the mobile station shown in FIG. 9 is illustrated in FIG. 11. In the shown embodiment, similarly to the transmission power control symbol generating portion 12 shown in FIG. 9, the mobile station constantly transmit the base station transmission power value and the minimum propagation loss base station index. However, concerning setting of the base station transmission power value, control of increasing or decreasing of a given power control amount to and from the current transmission power value is performed depending upon result of comparison between the reception quality Rq and the given quality threshold value Rth.

At control step PC001, comparison of the measured reception quality Rq [dB] and the quality threshold value Rth [dB] in the mobile station is performed. When the reception quality Rq is greater than the quality threshold value Rth, the power attenuation amount ΔPd [dB] is subtracted from the current base station transmission power mobile station management value Pmbs [dBW] at control step PC003. If the reception quality Rq is smaller than the quality threshold value Rth, the power increasing amount ΔPu [dB] is added to the current base station transmission power mobile station management value Pmbs [dBW] at control step PC002. The value of the base station transmission power mobile station management value Pmbs is combined with the minimum propagation loss base station index Bpmi to be output as the transmission power control information symbol Spct at control step PC002. In the shown embodiment of the mobile station, the base station transmission power control system according to the present invention enables soft hand over operation with the base station having the transmission power control portion 27 shown in FIG. 10, is incorporated.

A still further embodiment of the mobile station and the base station according to the present invention, particularly the embodiment, in which the transmission power control information symbol generating means 12 and the transmission power control portion 27 are modified, will be discussed. The shown embodiment is directed to the base station power transmission system employing a construction, in which the minimum propagation loss base station index is constantly transmitted from the mobile station to the base station. In the shown embodiment, the minimum propagation loss base station index is transmitted intermittently.

Figure 12:
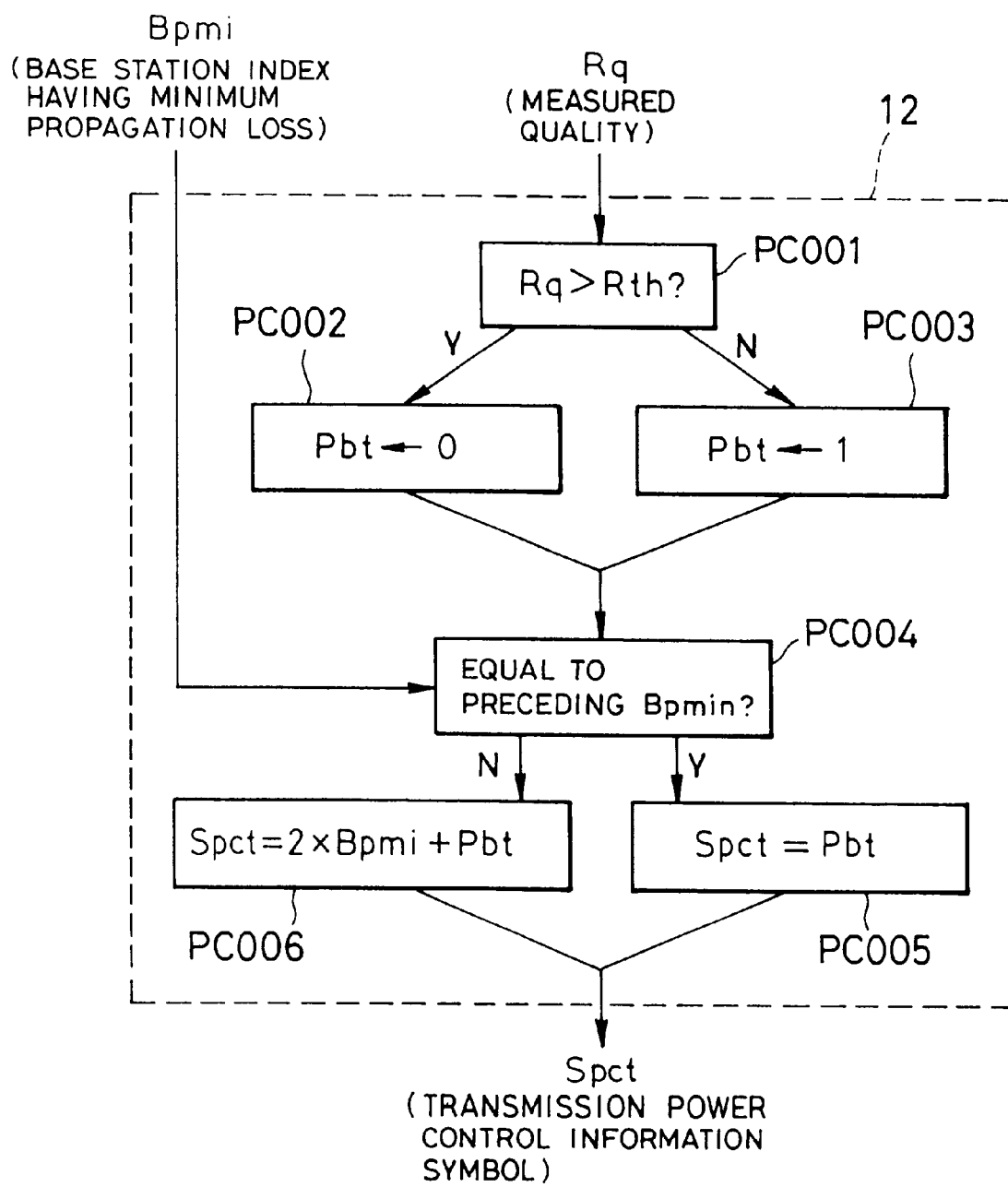
FIG. 12 is an illustration showing an operation of the transmission power control information symbol generating portion of a further embodiment of the mobile station according to the present invention.

FIG. 12 shows one embodiment of the mobile station intermittently transmitting the minimum propagation loss base station index, and illustrates a construction of the transmission power control symbol generating portion 12 transmitting the minimum propagation loss base station index only when variation thereof occurs.

At control step PC001, comparison of the reception quality Rq [dB] measured in the mobile station and the quality threshold value Rth is made. As a result of comparison, if the reception quality Rq [dB] is greater than the quality threshold value Rth [dB], a transmission power control bit Pbt is set to 0 at control step PC002. On the other hand, when the reception quality Rq [dB] is smaller than the quality threshold value Rth [dB], the transmission power control bit Pbt is set to 1, at control step PC003. Next, at control step PC004, reference is made to the minimum propagation loss base station index Bpmi. If the minimum propagation loss base station index Bpmi is equal to the preceding minimum propagation loss base station, the transmission power control information symbol Spct is set at a value equal to Pbt. Then, transmission power control information symbol Poct of one bit is output to the transmission power control information symbol inserting portion 17 of FIG. 1. On the other hand, when the minimum propagation loss base station index represents the base station different from the minimum propagation loss base station, the transmission power control information symbol Spct is set according to the following equation (2) to output the transmission power control information symbol Spct of two or more bits to the transmission power control information symbol inserting portion 17 of FIG. 1, at control step PC006.

$$Spct = 2 \times Bpmi + Pbt \qquad (2)$$

In the shown embodiment, when the minimum propagation loss base station is varied, the control bit consisted of two or more bits with containing the base station index Bpmi in the transmission power control information symbol Spct, is transmitted. On the other hand, when the minimum propagation loss base station is not varied, only control bit consisted of one bit is transmitted to the base station to reduce transmission amount of the transmission power control information.

Figure 13:
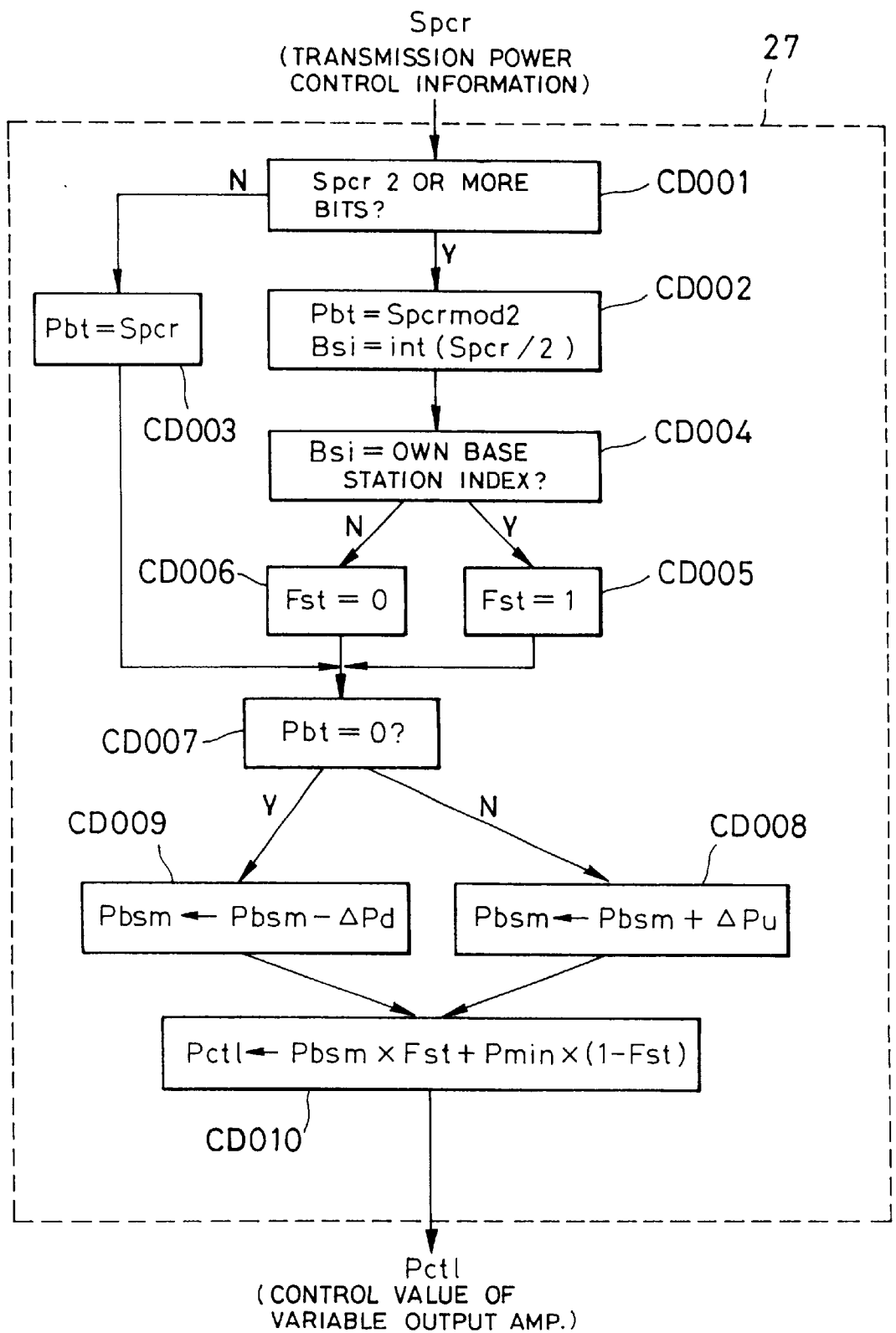
FIG. 13 is an illustration showing an operation of the transmission power control portion of a further embodiment of the base station corresponding to the mobile station shown in FIG. 12.

FIG. 13 is an illustration showing a construction of the transmission power control portion 27 in the base station according to the present invention corresponding to the transmission power control information symbol generating portion 12 shown in FIG. 12.

In the shown embodiment, at control step CD001, check is performed whether the transmission power control information Spcr is consisted of two or more bits or not. If the transmission power control information Spcr is consisted of two or more bits, the control bit Pbt and the minimum propagation loss base station index Bsi are obtained according to the following equations (3) and (4) at control step CD002.

$$Pbt = Spcr \bmod 2 \quad (3)$$

$$Bsi = int(Spcr/2) \quad (4)$$

wherein X mod Y is a remainder of division of X by Y and int (X) represents cut off integer. The equations (3) and (4) are equivalent to a process separating two bit control bit.

At control step CD002, after obtaining Pbt and Bsi, check is performed whether the minimum propagation loss base station index Bsi is equal to the own base station index or not at control step CD004. If the minimum propagation loss base station index Bsi is equal to the own base station index, the transmission flag Fst is set to 1 at control step CD005, and otherwise, the transmission flag Fst is set to 0 at control step CD006. Here, the initial value of the transmission flag Fst is 0. The transmission flag Fst as set is maintained until next change.

On the other hand, at control step CD001, when the transmission power control information Spcr is not consisted of two or more bits, the control bit Pbt is set to a value equal to the value of the transmission power control information Spcr. After control step CD003, as the value of the transmission flag Fst, the preceding value is used as it is.

Next, at control step CD007, check is performed whether the control bit Pbt is 0 or not. If the control bit Pbt is 0, the power attenuation amount ΔAd [dB] is subtracted from the base station transmission power Pbsm [dBW] at step CD009. If the transmission power control information Spcr is not 0, the power increasing amount ΔAu [dB] is added to the base station transmission power Pbsm [dBW] at control step CD008. The control value Pctl [dbw] of the variable output amplifier 29 is calculated by the equation (1) to be output to the amplifier 29 at control step CD010.

Figure 14:
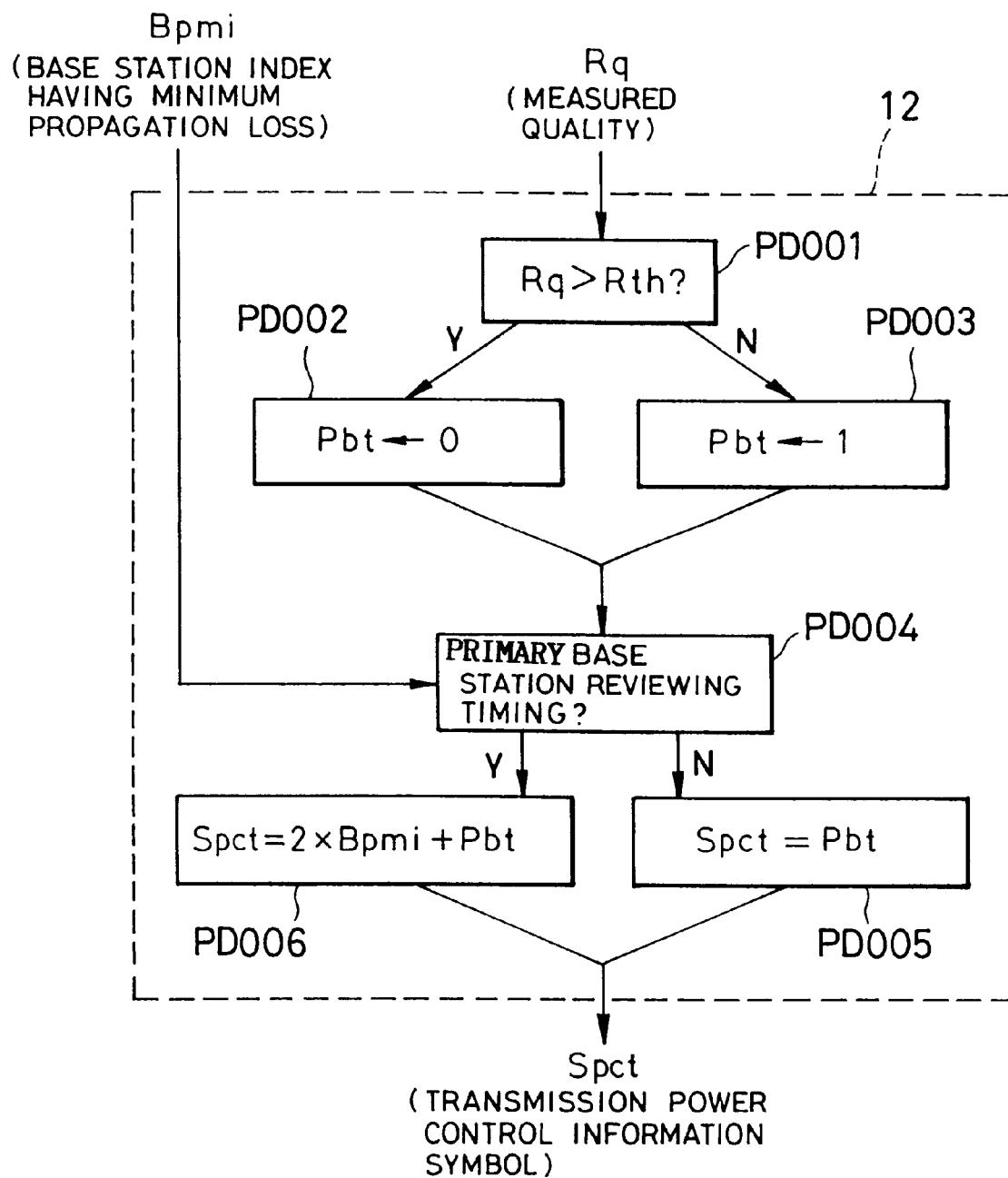
FIG. 14 is an illustration showing an operation of the transmission power control information symbol generating portion of a further embodiment of the mobile station of FIG. 12.

FIG. 14 shows a yet further embodiment of the mobile station intermittently transmitting the minimum propagation loss base station index, in which the transmission power control information symbol generating portion 12 corresponding to the base station transmission power control portion 27 shown in FIG. 13 has different construction. In the shown embodiment, review of the transmission power of the primary base station is performed regularly to regularly transmit the minimum propagation loss base station index.

At control step PD001, comparison of the reception quality Rq [dB] measured in the mobile station and the equality threshold value Rth is performed. As a result of comparison, if the reception quality Rq [dB] is greater than the quality threshold value Rth [dB], at control step PD002, the transmission power control bit Pbt is set to 0. If the reception quality Rq [dB] is smaller than the quality threshold value Rth [dB], at control step PD003, the transmission power control bit Pbt is set to 1. Next, at control step PD004, check is performed whether a current timing is a timing for effecting review of the primary base station or not. If the current timing is the reviewing timing, at control step PD006, the transmission power control information symbol Spct is set according to the foregoing equation (2). If the current timing is not the reviewing timing, the transmission power control information symbol Spct is set to be equal to Pbt at control step PD005. The transmission power control information symbol Spct determined at either step of PD005 or PD006 is output to the transmission power control information symbol inserting portion 17 of FIG. 1.

Figure 15:
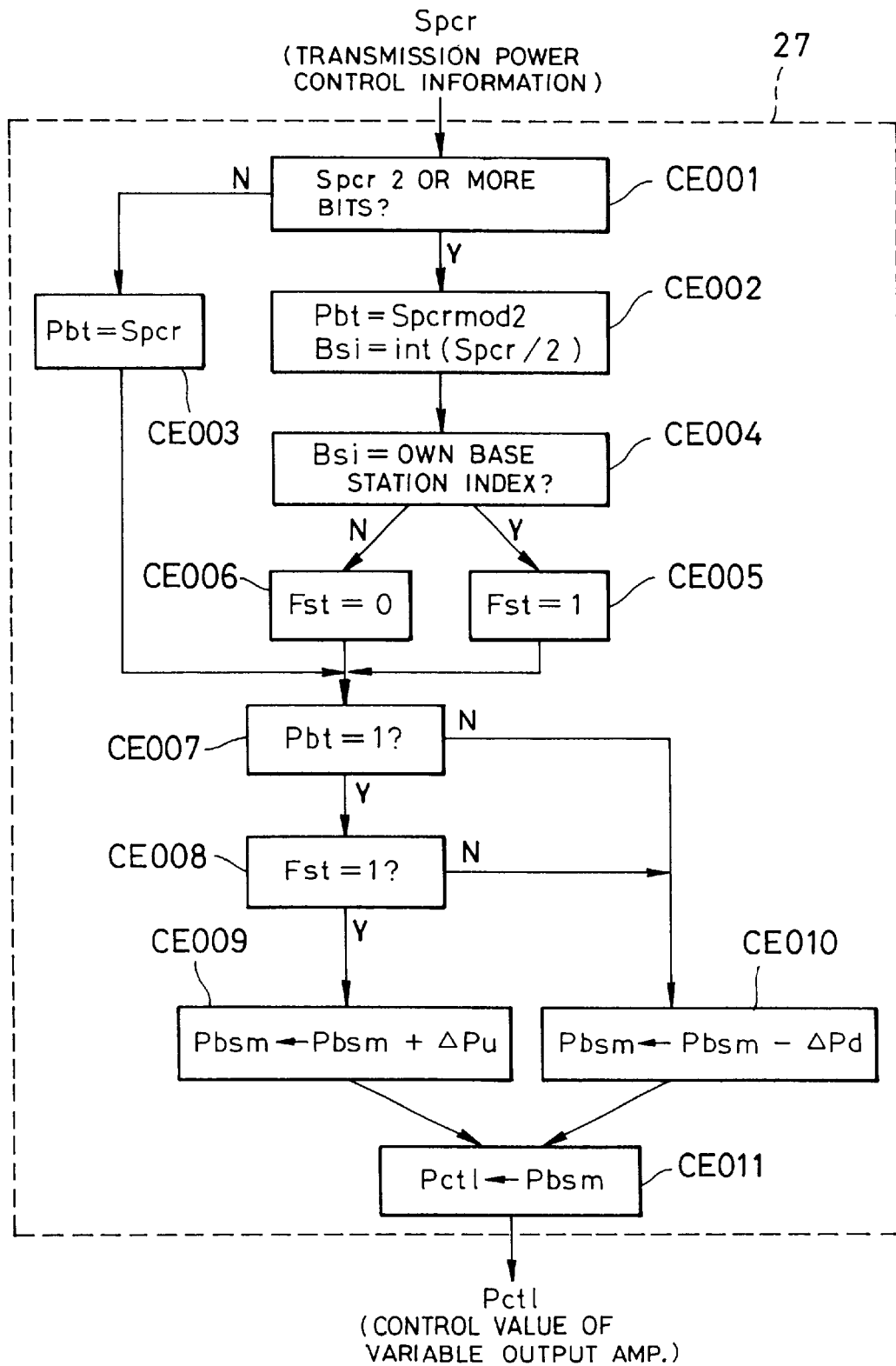
FIG. 15 is an illustration showing an operation of a transmission power control portion of a further embodiment of the base station shown in FIG. 13.

FIG. 15 shows a construction which is differentiated in the transmission power control portion 27 of the base station corresponding to the transmission power control information symbol generating portion 12 shown in FIG. 12 or 14. In the shown embodiment, as the control value Pctl of the transmission power, increasing and decreasing control of the given power control amount for the current control value is performed.

At control step CE001, check is performed whether the transmission power control information Spcr is consisted of two or more bits. If the transmission power control information Spcr is consisted of two or more bits, the control bit Pbt and the minimum propagation loss base station index Bsi are obtained according to the foregoing equations (3) and (4) at control step CE002. After obtaining Pbt and Bsi at step CE002, check is performed whether the minimum propagation loss base station index is equal to the own base station index or not. When the minimum propagation loss base station index Bsi is equal to the own base station index, the transmission flag Fst is set at control step CE005. Otherwise, the control flag Fst is set 0 at control step CE006. Here, the initial value of the transmission flag Fst is 0, the value of the set transmission flag is constantly held as is until next change.

On the other hand, when the transmission power control information Spcr is judged as being consisted of two or more bits at control step CE001, the control bit Pbt is set at a value equal to the transmission power control information Spcr at control step CE003. After control step CE003, as the value of the transmission flag Fst, the preceding value is used.

Next, check is performed whether Pbt is 1 or not at control step CE007. If Pb is 1, check is performed whether Fst is 1 or not at control step CE008. If both of the control bit Pbt and the transmission flag Fst are 1, the power increasing amount ΔAu [dB] is added to the base station transmission power Pbsm [dBW] at control step CE009. Otherwise, the power attenuation amount ΔPd [dB] is subtracted from the base station transmission power Pbsm [dBW] at control step CE010. The value of base station transmission power Pbsm is replaced with Pctl and output to the variable output amplifier 29.

The base station transmission power control system according to the present invention is constructed by the mobile station having the transmission power control information symbol 12 shown in FIG. 12 or 14 and the base station having the transmission power control portion 27 shown in FIG. 13 or 15.

As yet further embodiment of the present invention, a construction, discussion will be given for the mobile station and the base station, and more particularly for the construction, in which the transmission power control information symbol generating portion 12 and the transmission power control portion 27 are differentiated.

Figure 16:
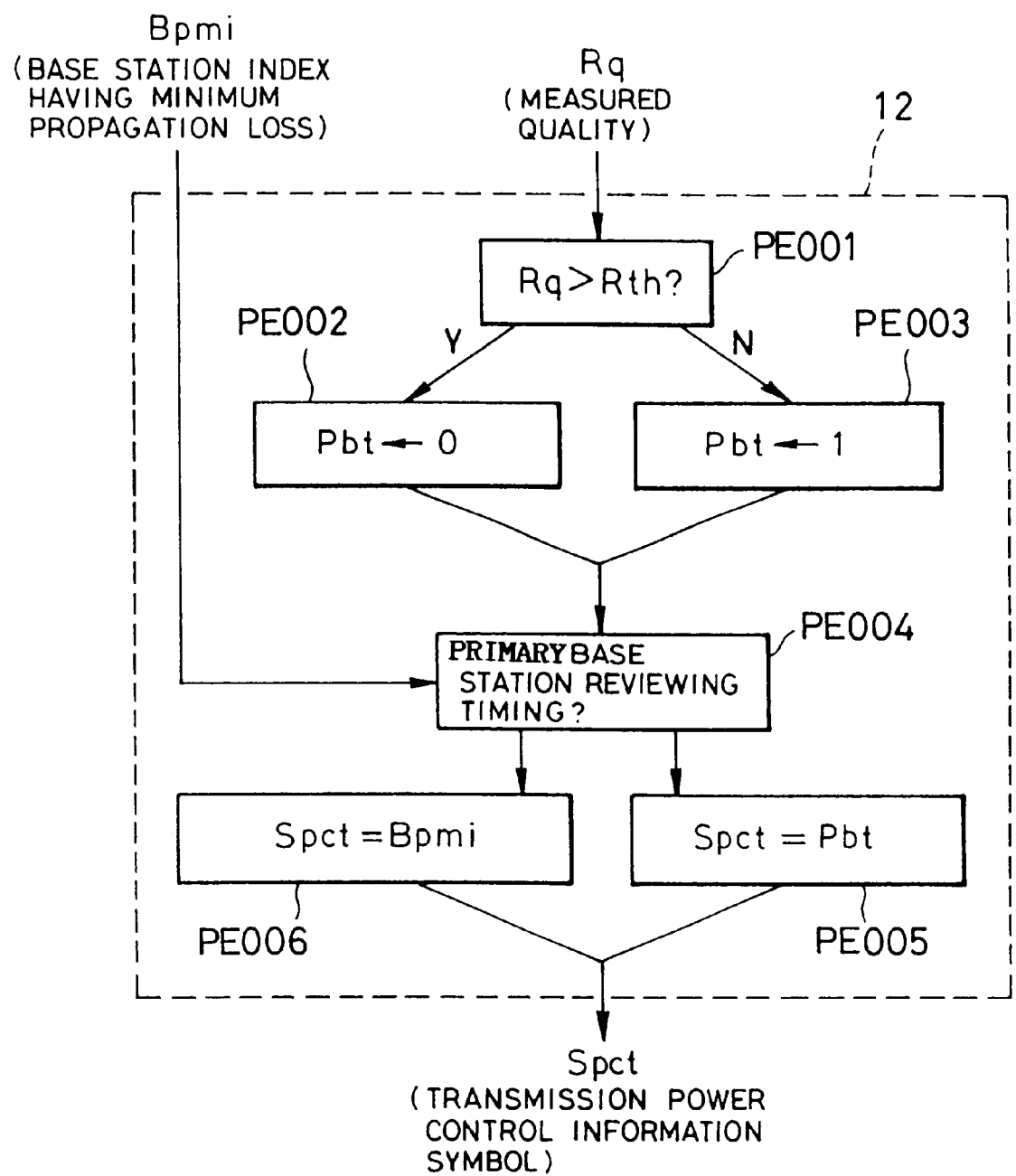
FIG. 16 is an illustration showing an operation of the transmission power control information symbol generating portion of a still further embodiment of the mobile station of FIGS. 12 and 14.

FIG. 16 is an illustration of the yet further embodiment of the mobile station according to the present invention, and particularly showing the transmission power control information symbol generating portion 12. The shown embodiment is premised to synchronous operation with the base station and is adapted to normally transmit only control information designating increasing and decreasing of the transmission power of the base station as the transmission power control signal and regularly transmit only primary base station information as the transmission power control signal.

At control step PE001, comparison of the reception quality Rq [dB] measured in the mobile station and the quality threshold value Rth is performed. As a result of comparison, if the reception quality Rq [dB] is greater than the quality threshold value Rth [dB], the transmission power control bit Pbt is set at 0 at control step PE002. On the other hand, if the reception quality Rq [dB] is smaller than the quality threshold value Rth [dB], the transmission power control bit Pbt is set at 1 at control step PE003. Next, at control step PE004, check is performed whether the current timing is the primary base station reviewing timing or not. If the current timing is the primary base station reviewing timing, the transmission power control information symbol Spct is set to be equal to minimum propagation loss base station index Bpmi at control step PR006. On the other hand, if the current timing is not the primary base station reviewing timing, the transmission power control information symbol Spct is set to be equal to,Pbt at control step PE005. The transmission power control information symbol Spct determined at control step PE005 or PE006 is output to the transmission power control information symbol inserting portion 17 of FIG. 1.

Figure 17:
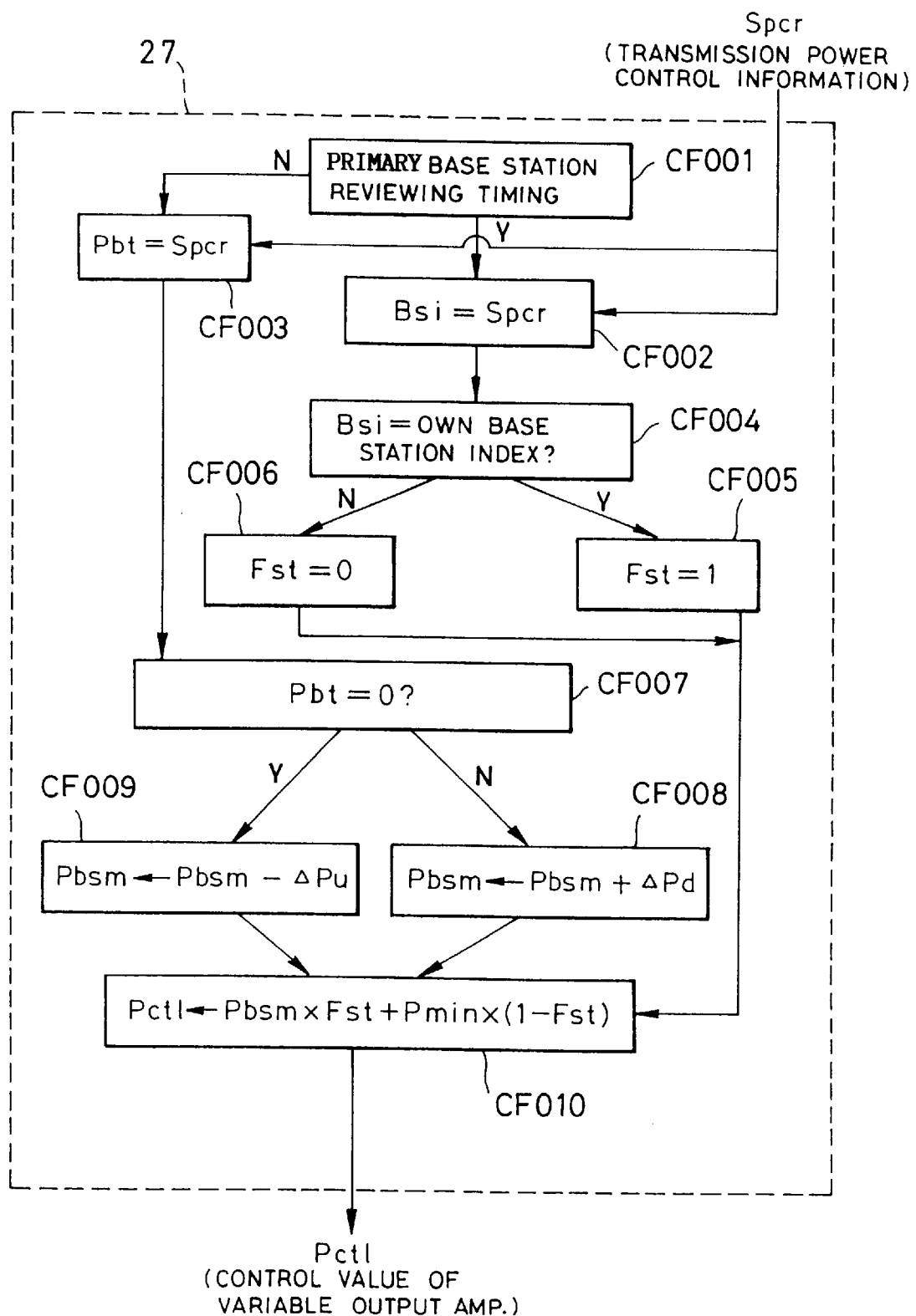
FIG. 17 is an illustration showing an operation of the transmission power control portion of a still further embodiment of the base station shown in FIGS. 13 or 15.

FIG. 17 is an illustration showing a construction of the transmission power control portion 27 in the base station according to the present invention corresponding to the transmission power control information symbol generating portion 12 shown in FIG. 16. In the shown embodiment, transmission power restriction control is performed in synchronism with the primary base station information to be regularly transmitted from the mobile station to output the control value Pctl.

At first, at control step CF001, check is performed whether the current timing is the primary base station reviewing timing. Here, the reviewing timing of the primary base station of respective mobile station and the base station are established synchronization with each other. When the current timing is judged as primary base station reviewing timing as checked at control step CF001, the transmission power control bit Pbt is set to be equal to the transmission power control information symbol Spcr at control step CF003. Then, at control step CF007, check is performed whether Pbt is 0 or not. If Pbt is 0, the power attenuation amount $\Delta Ad$ [dB] is subtracted from the base station transmission power Pbsm [dBW] at control step CF009. If Pbt is not 0, the power increasing amount $\Delta Pu$ [dB] is added to the base station transmission power Pbsm [dBW] at control step CF008.

After determining the base station transmission power Pbsm at control step CF005 or CF006, the control value Pctl [dBW] of the variable output amplifier is derived by the foregoing formula (1) at control step CF010 for outputting the control value Pctl to the variable output amplifier 29 of FIG. 2.

On the other hand, when judgment is made whether the current timing is the primary base station reviewing timing at control step CF001, the minimum propagation loss base station index Bsi and the transmission power control information symbol Spcr are set to be equal to each other at control step CF002. Also, check is performed whether Bsi is equal to the own base station index at control step CF004. When judgment is made that Bsi is equal to the own base station index, the transmission flag Fst is set at 1 at control step CF005. Otherwise, Fst is set at 0 at control step CF006. Here, the initial value of the transmission flag Fst is 0 and the set transmission flag is maintained as is until occurrence of next change.

After determination of the transmission flag Fst at control step CF005 or CF006, the control value Pctl [dBW] of the variable output amplifier 29 is derived by the foregoing formula (1) at control step CF010. Then, Pctl is output to the variable output amplifier 29 of FIG. 2.

Figure 18:
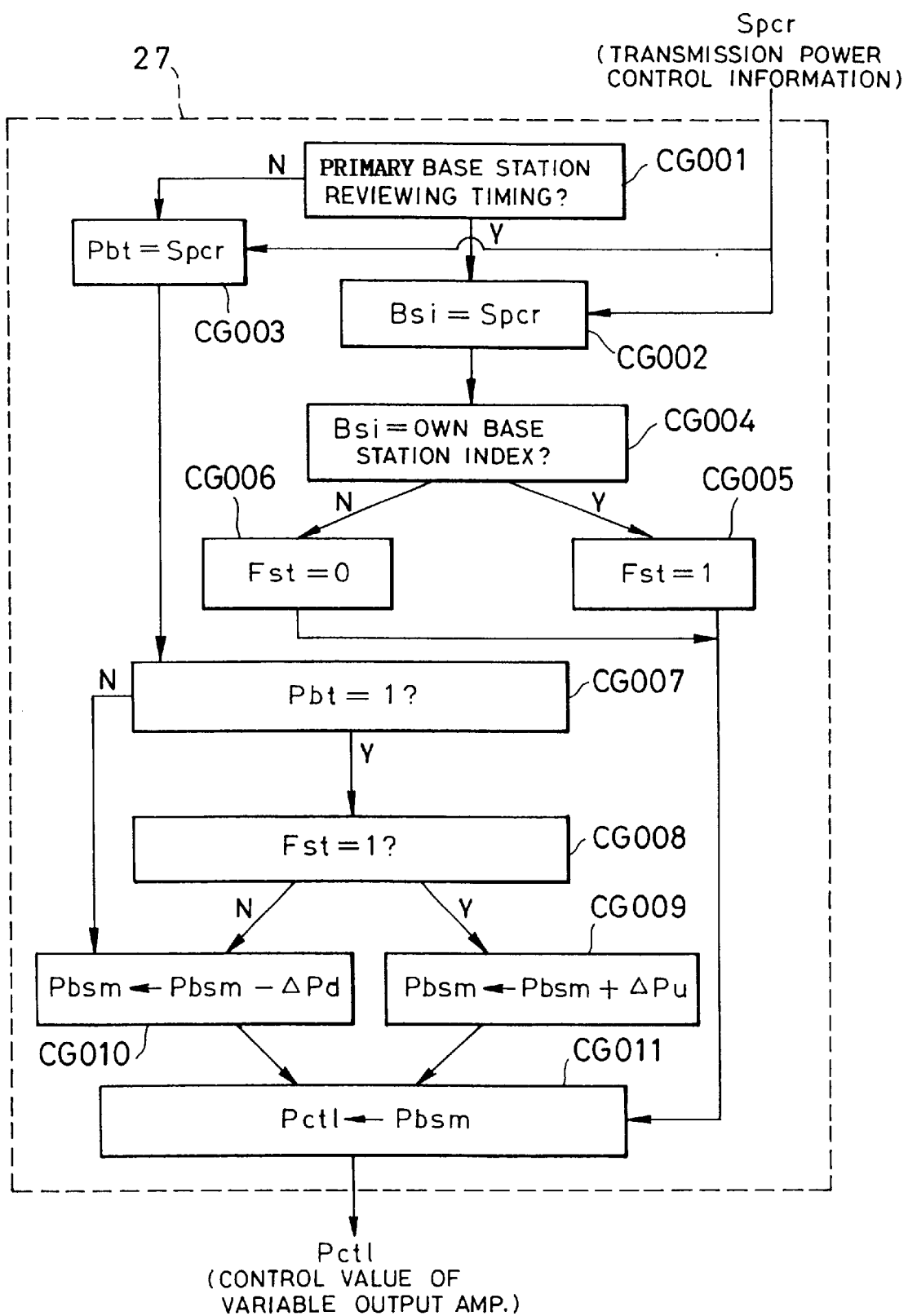
FIG. 18 is an illustration showing an operation of the transmission power control portion of a still further embodiment of the base station shown in FIGS. 13, 15 or 17.

FIG. 18 shows an another embodiment of the base station of the present invention. The shown embodiment is particularly differentiated in the transmission power control portion 27 corresponding to the transmission power control shown in FIG. 16. The shown embodiment is adapted to perform increasing and decreasing control for the control value Pctl of the transmission power with a given power control amount relative to the current control value.

At control step CG001, check is performed whether the current timing is the primary base station reviewing timing or not. Here, the primary base station reviewing timings in respective of the mobile station and the base station are assumed to be synchronized with each other. At control step CG001, if the current timing is judged as the primary base station reviewing timing, the minimum propagation loss base station index Bsi is set equal to the transmission power control information symbol Spcr at control step CG002. Also, at step CG004, check is performed whether the base station index of own station is equal to BSi. If judgment is made that BSi is equal to the base station index of own station, the transmission flag Fst is set to 1 at control step CG005, and otherwise, the transmission flag Fst is set to 0 at control step CG006. Here, the initial value of the transmission flag Fst is 0, and set transmission flag is maintained until next change.

After determination of the transmission flag Fst at control step CG005 or CG006, the control value Pctl [dBW] of the variable output amplifier 29 is set equal to Pbsm at control step CG011. Then, the control value Pctl is output to the variable output amplifier 29 of FIG. 2.

On the other hand, at control step CG001, if the current timing is not judged as the primary base station reviewing timing, the transmission power control bit Pbt is set to be equal to the transmission power control information symbol Spcr at control step CG003. Check is performed whether Pbt is 1 or not at control step CG007.

If judgment is made that Pbt is not 1 at control step CG007, the power attenuation amount $\Delta Ad$ [dB] is subtracted from the base station transmission power Pbsm at control step CG010. On the other hand, if judgment is made that Pbt is 1 at control step CG007, check is performed whether the transmission flag Fst is 1 or not at control step CG008. If Fst is not 1, the power attenuation amount $\Delta Ad$ [dB] is subtracted from the base station transmission power Pbsm at control step CG010. On the other hand, when Fst is 1, the power increasing amount $\Delta Au$ [dB] is added to the base station transmission power Pbsm [dBW] at control step CG009. After determination of the transmission flag Fst at control step CG009 or CG010, the control value Pctl [dBW] of the variable output amplifier 29 is set to be equal to Pbsm. Then, Pctl is output to the variable output amplifier 29 of FIG. 2.

The base station transmission power control system according to the present invention is constructed with the mobile station having the transmission power control information symbol generating portion 12 shown in FIG. 16 and the base station having the transmission power control portion 27 shown in FIGS. 17 and 18.

With transmission power control method according to the present invention, by restricting output of the base stations other than the primary base station, in which the propagation loss with the mobile station is minimum, interference for the peripheral mobile stations can be reduced in comparison with the conventional transmission power control method. As a result, high down link capacity can be obtained.

On the other hand, by restricting the transmission power of the base stations other than the primary base station during soft hand over, increasing of interference of down link due to a plural base station transmission which raises problem of soft hand over, can be avoided.

Furthermore, since the transmission power control system according to the present invention is premised to application of soft hand over, connection between the mobile station and the minimum propagation loss base station is guaranteed even when hand over control delay is present. Accordingly, transmission of the excessive transmission power of the former base station connected before hand over due to hand over delay, can be avoided.

In the foregoing transmission power control system according to the present invention, in order to realize selection of the primary base station, the mobile station uses the base station number of the primary base station as the transmission power control signal. When increasing of the transmission power is to be demanded to the base station, the mobile station transmits the base station number of the primary base station. On the other hand, when decreasing of the transmission power is to be demanded, the mobile station transmits a dedicated number. On the other hand, during soft hand over, each base station increases transmission power when the own base station number is transmitted, and decreases otherwise. Particularly, when the base station number other than own base station is transmitted, the transmission power is restricted to the minimum power abruptly.

Next, observation is made for the case of transmission power control according to the system according to the present invention. Soft hand over is essential technology for realizing communication with the minimum propagation loss base station in the real system, in which hand over control delay cannot be ignored. Concerning the down link, since a plurality of base stations have to perform transmission to one mobile station, interference for the mobile station is inherently increased. As can be clear from comparison of FIGS. 19 and 34, all base stations are constantly performing transmission during soft hand over in the conventional transmission power control system with taking the base station transmission power of FIG. 34, whereas, in the shown embodiment, only minimum propagation loss base station performs transmission and other base stations are restricted the transmission power to the minimum transmission power. By this, the problem of increasing of interference by the plural base station transmission as in the soft hand over, can be successfully avoided.

However, the shown embodiment of the system, in which the serial number of the primary base station is utilized as the transmission power control signal, causes error in selection of the base station when reception error is caused in the transmission power control signal. Then, as in the timing T0' [sec] and T1' [sec] of the dotted link in FIG. 19, the state where the transmission powers of both of the base stations become minimum transmission power, is frequently caused. This phenomenon is considered to be caused by abrupt restriction of the output to the minimum transmission power value when the base station number identifying the base station other than own base station is received as the transmission power control signal. Namely, it is frequently caused that, despite of the fact that when reception error in reception of the transmission power control signal is caused, the base station number of own base station is transmitted, the base station erroneously make judgment that the base station number of other base station is transmitted to make all base stations to transmit the minimum transmission power during soft hand over as observed in FIG. 19. In this case, in the mobile station, reception quality is significantly degraded due to lowering of the reception intensity of the desired signal.

Figure 20:
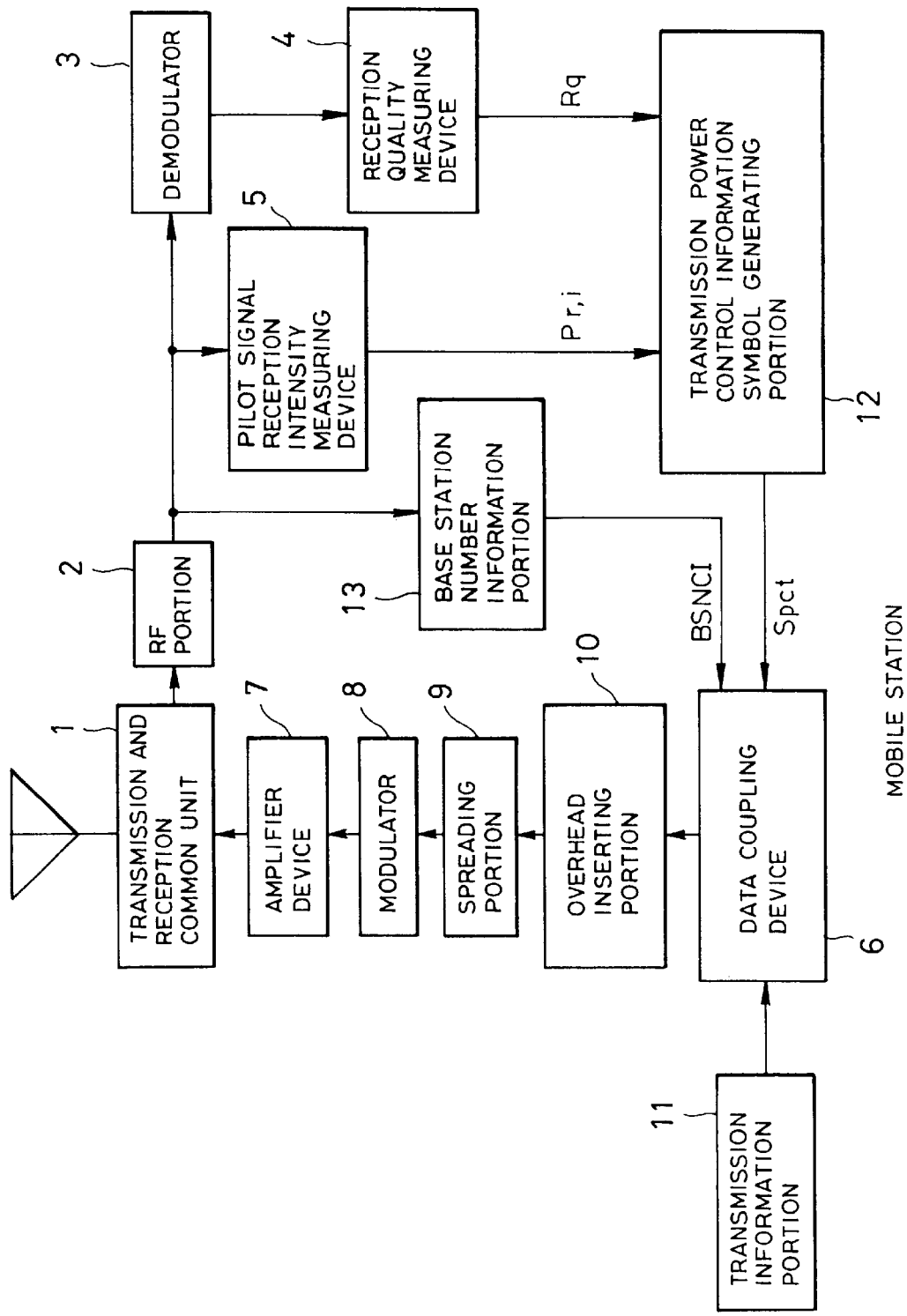
FIG. 20 is a block diagram of an embodiment of the mobile station according to the present invention.

A further embodiment of the present invention for solving the foregoing problem will be discussed hereinafter. Referring to FIG. 20, the transmission signal transmitted from the base station is received via the transmission and reception common unit 1, the RF portion 2 and the demodulation circuit 3, and is measured the reception quality Rq [dB] by the reception quality measuring unit 4. The reception quality obtained via the demodulation circuit 3 and the reception quality measuring unit 4 represents composite quality of the signal from a plurality of base stations during soft hand over. On the other hand, the pilot signal transmitted from each base station and contained in the output of the RF portion 2 during soft hand over is measured the pilot reception intensity Pr,i in the pilot signal reception intensity measuring unit 5. Here, i represents the number of the base station during soft hand over, which will be discussed in detail with reference to FIGS. 24 to 27. For the base stations, serial integer values starting from 1 is assigned during soft hand over.

When the base station number equal to different base station is assigned, a composite value of the reception levels of the pilot signals transmitted from the respective base stations is taken. Assignment of each base station number is determined in the base station number information portion 13 with reference to the output value of the RF portion 2 and output as the base station number assignment information BSNCI.

The reception quality Rq and the pilot reception intensity Pr,i are input to the transmission power control information symbol generating portion 12. The transmission power control information symbol generating portion 12 generates the transmission power control information symbol Spct for the base station. The transmission power control information symbol Spct is coupled with the transmission signal output from the transmission information portion 11 and the base station number assignment information BSCI as output of the base station number information portion 13, in the data coupling portion 6. It should be appreciated that when the base station number assignment information BSNCI is "NULL", coupling of the base station number assignment information is not performed. Furthermore, the output signal of the data coupling portion 6 is inserted the overhead information in the overhead inserting portion 10. When the transmission information, the transmission power control information, the overhead information and the base station assignment information are contained, the transmission signal containing such information is transmitted to the base station via the spreading portion 9, the modulator 8, the amplifier unit 7 and the transmission and reception common unit 1.

Figure 21:
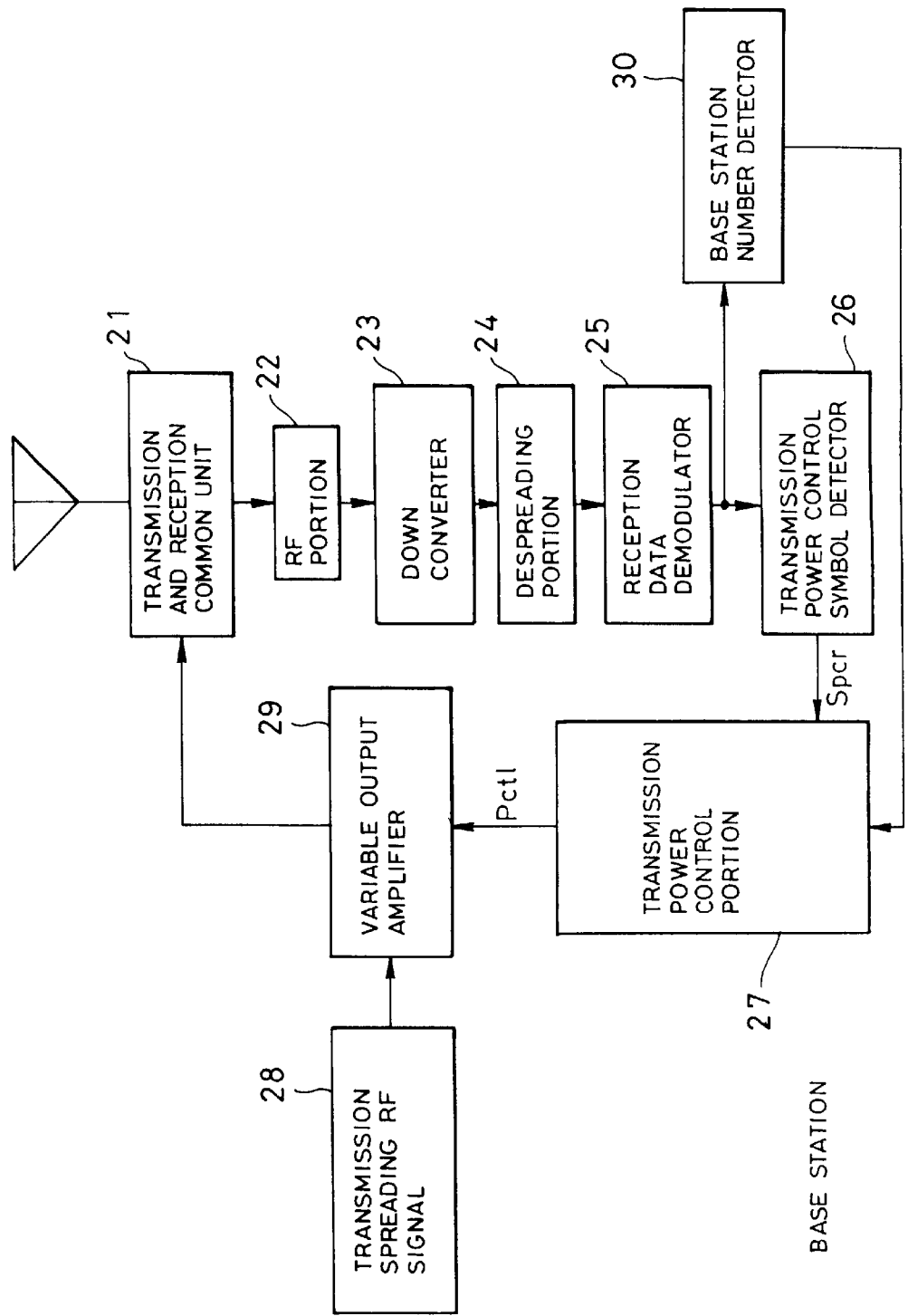
FIG. 21 is a block diagram of an embodiment of the base station according to the present invention.

FIG. 21 is an illustration showing a construction of the shown embodiment of the base station. The transmission signal containing transmission power control information transmitted from the mobile station shown in FIG. 20 is transmitted to the transmission power control symbol detector 26 via the transmission and reception common unit 21, the RF portion 22, the frequency down converter 23, the despreading portion 24, and the reception data demodulator 25. Then, the transmission power control symbol detector 26 detects the transmission power control information Spcr. The transmission power control information Spcr is input to the transmission power control portion 27. The transmission power control portion 27 outputs the control value Pctl so that the output level [dBW] of the variable output amplifier 29 becomes a value reflecting the transmission power control information Spcr on the basis of the transmission power control information Spcr. The transmission signal to the mobile station output from the transmission spreaded RF signal portion 28 is amplified by the variable output amplifier 29 controlled by the signal Pctl and transmitted to the mobile station via the transmission and reception common unit 21.

On the other hand, the output of the reception data demodulator 25 is input to the base station number detector 30. In the base station number detector 30, the own base station assignment number i transmitted from the mobile station is detected. However, the base station number assignment information from the mobile station is not transmitted, varying of the base station number is not performed.

Figure 22:
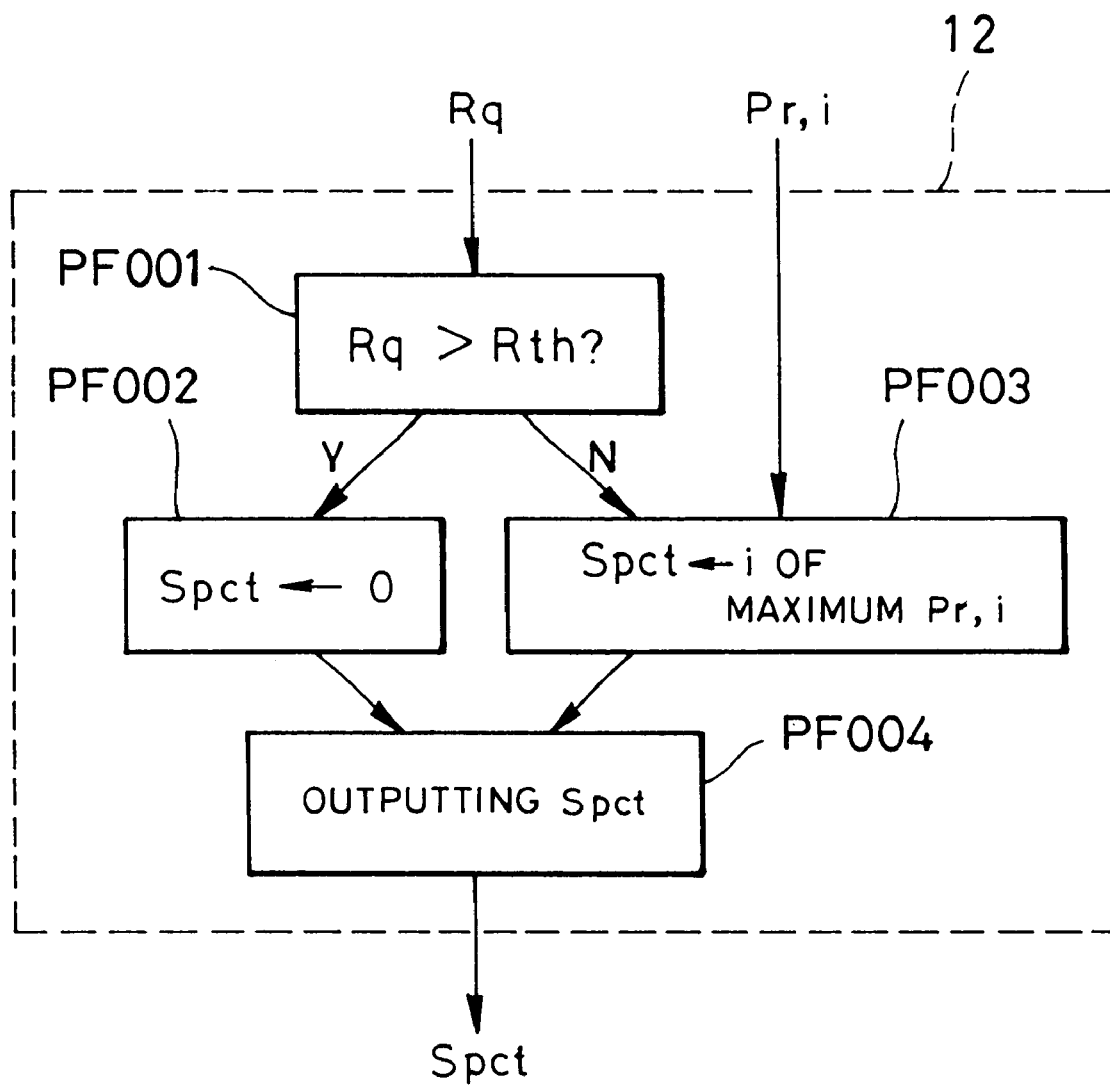
FIG. 22 is an illustration showing a process of the transmission power control information symbol generating portion in the block diagram of FIG. 20.
Figure 23:
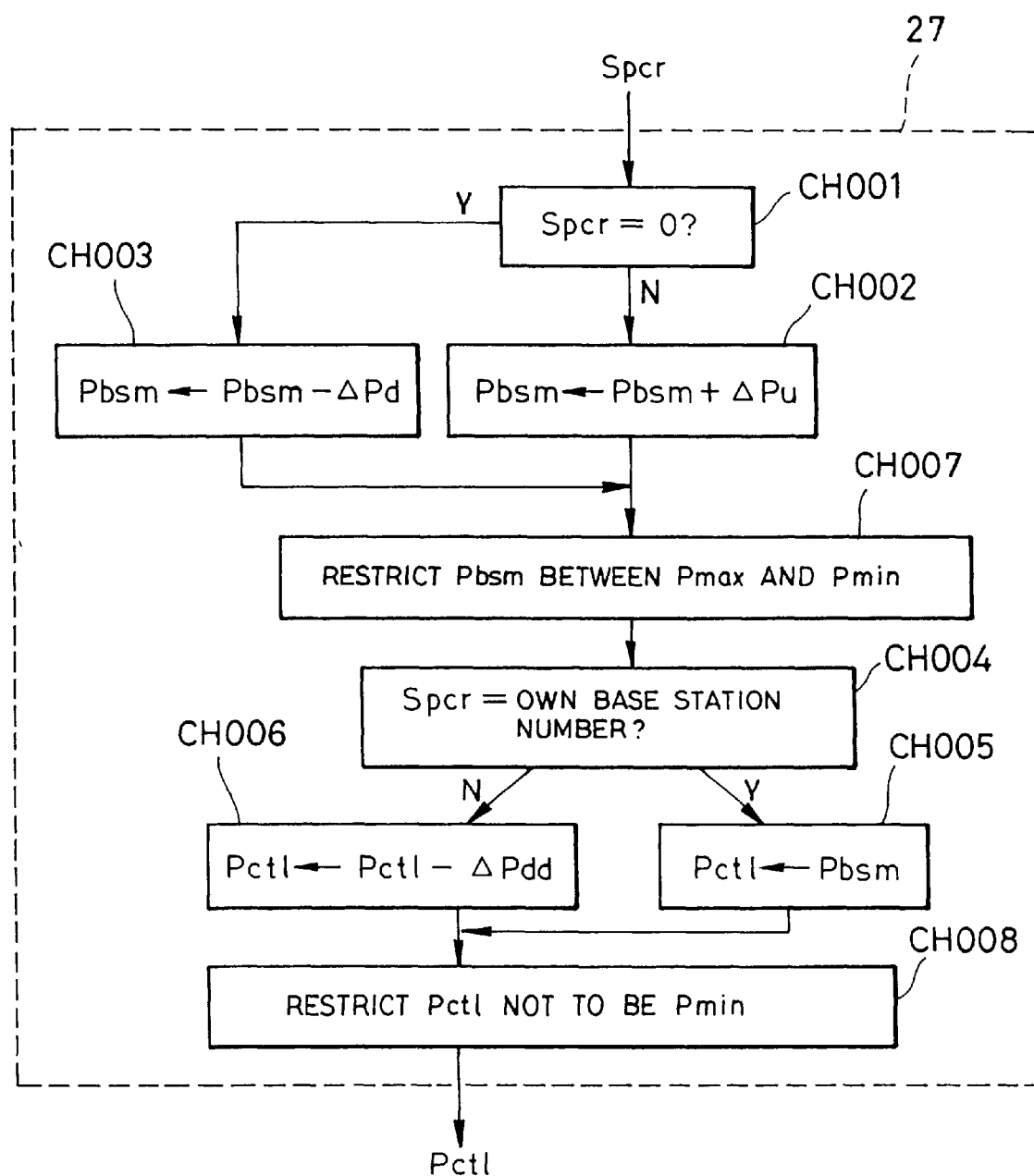
FIG. 23 is an illustration showing a process of the transmission power control portion in the block diagram shown in FIG. 21.
Figure 24:
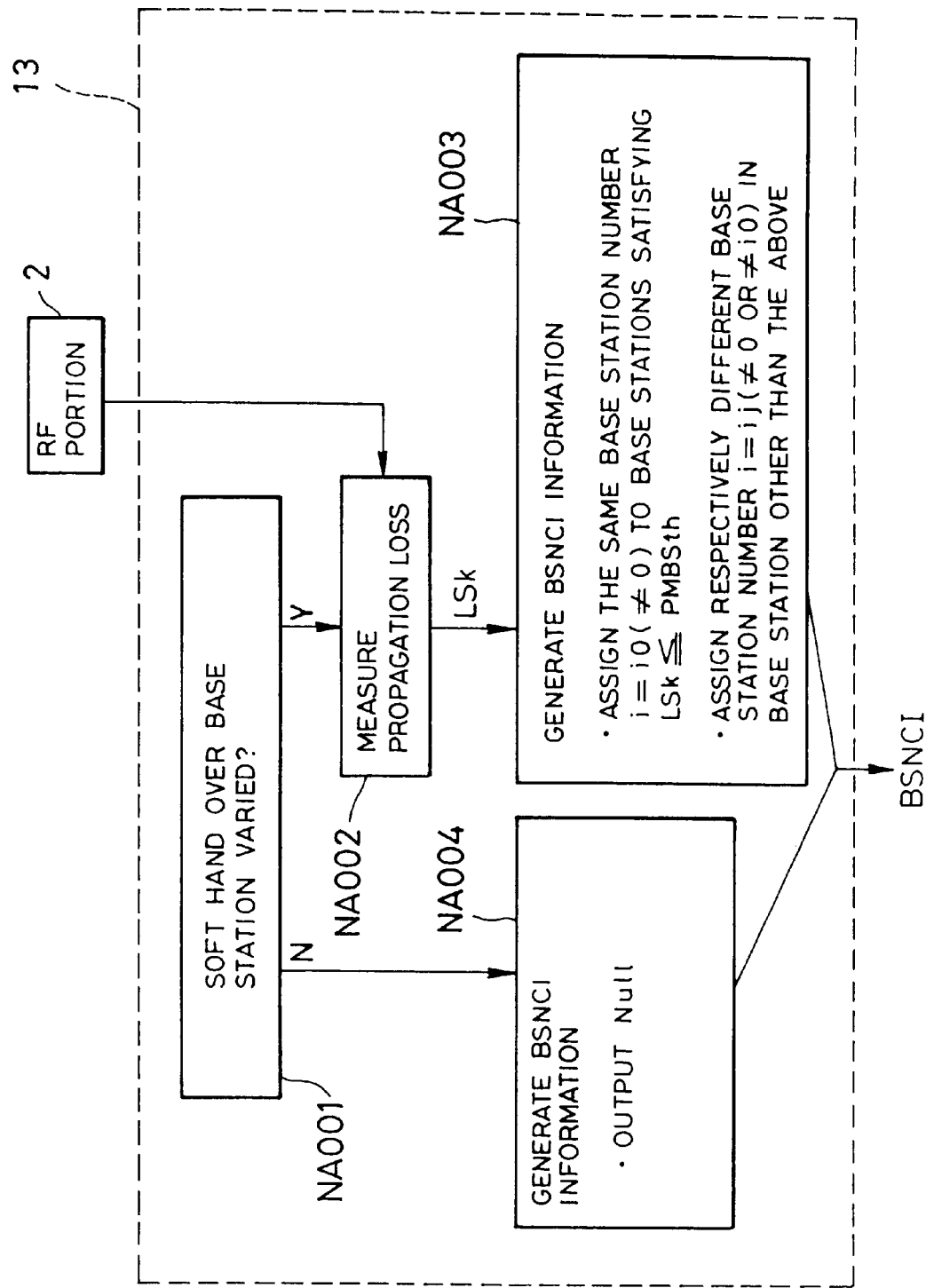
FIG. 24 is an illustration showing one example of the process of a base station number information portion in the block diagram of FIG. 20.

FIGS. 22, 23 and 24 are flowcharts of one embodiment of signal processing of the transmission power control information symbol generating portion 12 of the mobile station, the transmission power control portion 27 of the base station and the base signal number information portion 13 in the mobile station. At first, in the mobile station shown in FIG. 22, operation of the transmission power control information symbol generating portion 12 will be discussed. The reception quality Rq measured in the mobile station is compared with the quality threshold value Rth [dB] in control step PF001. As a result of comparison, if Rq >Rth, the transmission power control information symbol Spct is set to a dedicated information "0" representative of power decreasing command at control step PF002. Otherwise, Spct is set to the base station number i, at which the pilot reception intensity Pr,i measured in the pilot signal reception intensity measuring unit 5 becomes maximum at control step PF003. Then, at control step PF004, any of the transmission power control information symbol Spct is output.

Next, discussion will be given for operation of the transmission power control portion 27 in the base station shown in FIG. 23. The transmission power control information Spcr a detected by the transmission power control symbol detector 26 is judged whether the transmission power control information Spcr is "0" at control step CH001. If the transmission power control information Spcr is not "0", the given power increasing amount ΔAu [dB] is added to a current virtual base station transmission power Pbsm [dBW] directed to the mobile station which transmitted the transmission power control information Spcr at control step CH002. On the other hand, when the transmission power control information Spcr is "0", the given power attenuation amount ΔAd [dB] is subtracted from the virtual base station transmission power Pbsm at control step CH003. It should be noted that the value of the virtual base station transmission power Pbsm is held as the updated value in the preceding timing. After variation of the virtual base station transmission power Pbsm at control step CH002 or CH003, Pbsm is restricted so that it falls within a range of a maximum transmission power Pmax and the minimum transmission power Pmin at control step CH007.

After control step CH007, check is performed whether the transmission power control information Spcr is consistent with the base station number of own base station at control step CH004. If Spcr is consistent with the base station number of the own base station, the control value Pctl is set so that the output of the variable output amplifier 29 shown in FIG. 21 becomes Pbsm at control step CH005. On the other hand, when By the transmission power control information Spcr is not consistent with the base station number of the base station, a control value ΔPd. corresponding to the given power attenuation amount is subtracted from the control value Pctl at control step CH006. The value of the control value Pctl is held at a value updated in the preceding timing.

The control value Pctl obtained at control step CH005 or CH006 is restricted so that the transmission power is smaller than the minimum transmission power Pmin at control step CH008. Thereafter, the transmission power is output to the variable output amplifier 29. The base station transmission power is controlled to the power corresponding to the control value Octl by the variable output amplifier 29.

Next, discussion will be given for an example of operation of the base station number information 13 in the mobile station shown in FIG. 24, and of assignment of the base station number i for the base station performing soft hand over. At first, at control step NA001, check is performed whether soft hand over base station is varied or not. If variation is not caused, "Null" namely nil information is set as the base station number assignment information BSCNI at control step NA004. On the other hand, when judgement is made that the soft hand over base station is varied at control step NA001, the reception intensity of the pilot signal transmitted from the new soft hand over base station is measured from the output signal of the RF portion 2 at propagation loss measuring step NA002. Furthermore, by this pilot reception intensity, propagation losses LSk from the mobile station to respective base stations are estimated. Here, k represents unique base station number of the base station during soft hand over.

At propagation loss measuring step NA002, the propagation loss LSk is input to control step NA003 for temporarily assigning the base station number i to respective base stations k during soft hand over at control step NA003. Concerning the base station number i=i0, all of the base stations satisfying the following formula (5) is assigned. Here, i0 is as number not dedicated number "0" of the power decreasing command.

$$LSk \leq PMBSth \tag{5}$$

wherein PMBSth represents a propagation loss threshold value.

When the transmission power control information symbol Spct is actually transmitted, a bit string consisted of several bits is used. The base station group satisfying the foregoing formula (5) is the base station group having small propagation loss to the mobile station. Namely, there is high probability that the base station number i=i0 of these base station group is selected as the transmission power control information symbol Spct when the mobile station demands increasing of the transmission power. On the other hand, when the mobile station demands decreasing of the transmission power, the dedicated number "0" for commanding decreasing of the power is constantly selected at control step PF002 of FIG. 22. Therefore, the transmission power control bit string expressing respective of the base station number i=i0 of the base station group satisfying the foregoing formula (5) and the dedicated number "0" representative of the power decreasing command is set to have large number of different bits in order to prevent erroneous detection the other.

FIG. 25 shows an embodiment of setting of the transmission power control bit string to be actually transmitted in the case where the base station number i=i0 and the dedicated number "0" indicative of the power decreasing command are used as the transmission power control information symbol Spct. Here, the transmission power control bit is assumed to be consisted of three bits.

For the base station not satisfying the foregoing formula (5), mutually distinct base station number i=ij is assigned. Here, ij is the number not "0" and not "i0". The base station number assignment information BSNCI determined at control step NA003 or NA004 is input to the data coupling unit 6 shown in FIG. 20.

In the base station transmission power control shown in FIG. 23, the control value Pctl of the variable output amplifier 29 is continuously attenuated at a rate of "ΔAd"

unless the base station number of own base station is transmitted as the transmission power control signal, to reach the minimum transmission power value Pmin. Then, the transmission power is maintained at the minimum transmission power value Pmin. Namely, when the mobile station transmits the base station number, in order to transmit the base station number of the primary base station, the transmission power of non-primary base station is maintained at the minimum transmission power Pmin. By this, problem of interference which is caused by simultaneous transmission of a plurality of base stations, can be avoided to achieve high down link capacity. On the other hand, upon restriction of the transmission power of the base station other than the primary base station, instead of restricting the transmission power abruptly, the transmission power is moderately attenuated at a rate "ΔAd". Thus, even when error is caused in selection of the base station, abrupt lowering of the desired reception field intensity in the mobile station is not caused to prevent significant degradation of the reception quality observed in the former embodiment shown in FIG. 19 can be prevented.

Since the virtual base station transmission power Pbsm is increased when the base station number is transmitted as the transmission power control signal, the condition of the minimum transmission power value Pmin as Pctl is not maintained for long period. The virtual base station transmission power Pbsm teaches a set target value of the control value Pctl in the case where the own base station number is transmitted after not transmitting the base station number of own base station for a while and serves for preventing degradation of quality of the desired signal. The virtual base station transmission power Pbsm is maintained at equal value in any base station during soft hand over so far as reception error is not present in the transmission power control signal and its initial values are equal.

On the other hand, by assigning the base station number equal to the base station group satisfying the formula (5), transmission by several base stations having small propagation loss including the base station, in which the propagation loss to the mobile station becomes minimum, can be achieved. When the transmission powers transmitted from several base stations are controlled at substantially equal value, the signals from any base stations are received at substantially equal reception intensity in the mobile station to improve communication quality.

Figure 26:
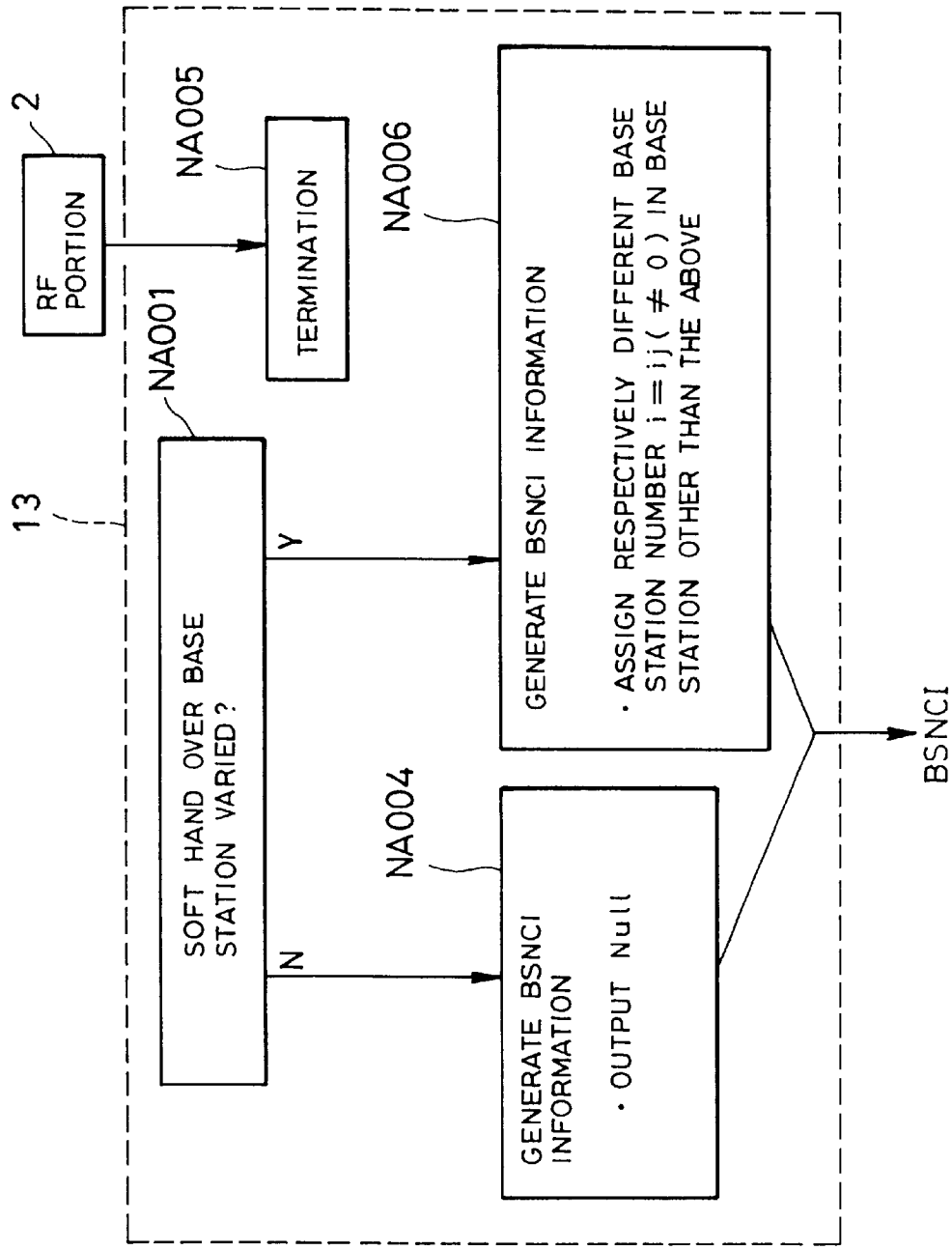
FIG. 26 is an illustration showing another example of the process of the base station number information portion in the block diagram of FIG. 20.

FIG. 26 is an illustration showing other embodiment of the base station number information portion 13 in the mobile station, like elements to those in FIG. 24 will be identified by like reference numerals. At first, at control step NA001, check is made whether soft hand over base station is varied or not. The soft hand over base station is not varied at control step NA004, "Null" namely nil information is set as the base station number assignment information BSNCI at control step NA004. When judgment is made that soft hand over base station is varied as checked at control step NA001, the base station number i=ij different from each base station is assigned at control step NA006. Here, ij is other than dedicated number "0" representative of the power decreasing command. The output signal of the RF portion 2 is not used in the shown embodiment and is terminated (step NA005).

As set forth above, in the shown embodiment, since measurement of the propagation loss (NA002) as required in the embodiment shown in FIG. 24 becomes unnecessary, construction of the mobile station can be simplified.

Figure 27:
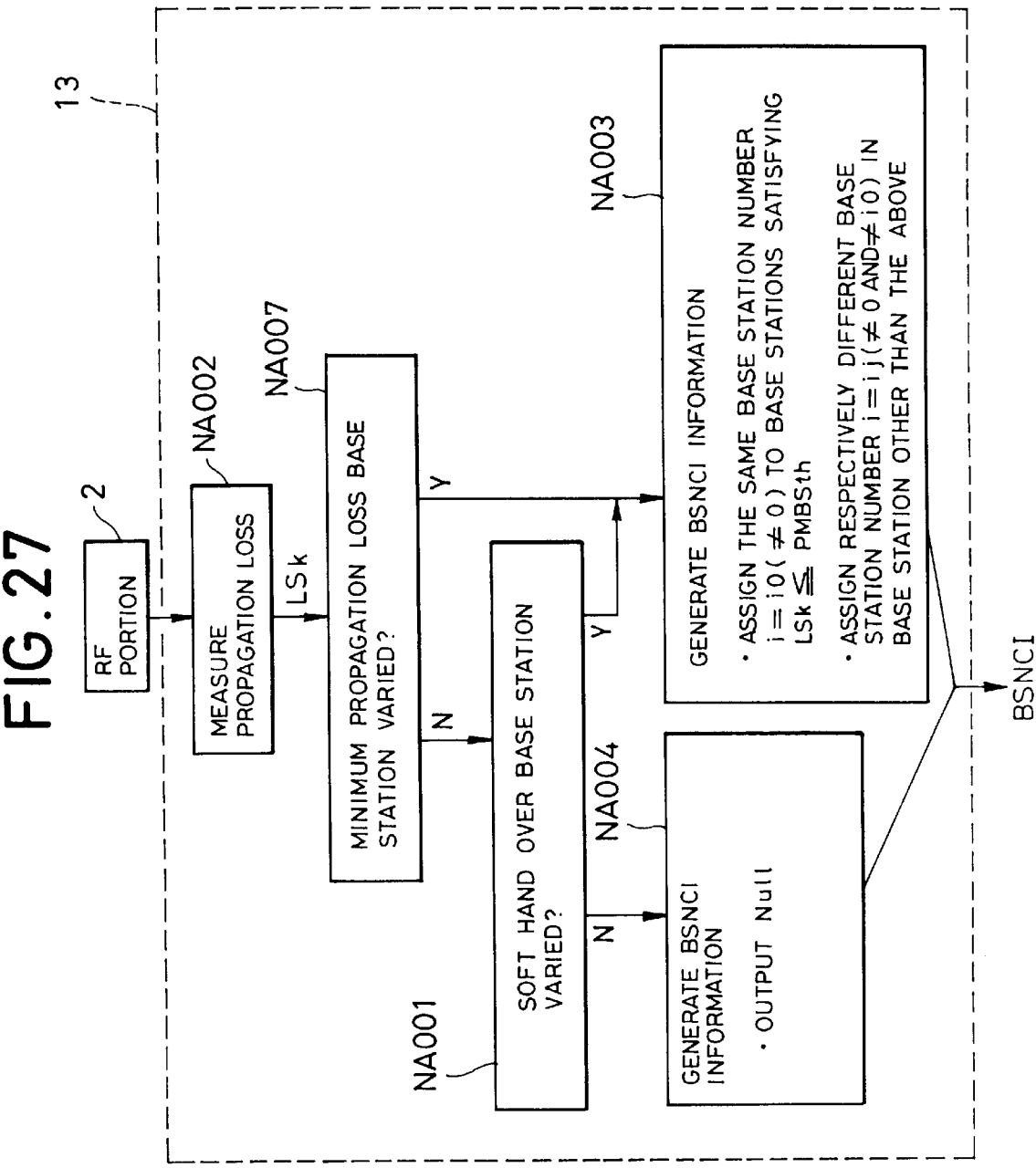
FIG. 27 is an illustration showing a further example of the process of the base station number information portion in the block diagram of FIG. 20.

FIG. 27 is an illustration showing another embodiment of the base station number information portion 13 in the mobile station. Like elements to those in FIG. 24 will be identified by like reference numerals. At first, at propagation loss measuring step NA002, reception intensity of the pilot signal transmitted from the base station during soft hand over is measured from the output signal of the RF portion 2. Furthermore, on the basis of reception intensity of the pilot signal, propagation loss LSk from the mobile station to the base station in soft hand over is estimated. k is unique base station number in soft hand over of all base stations in the system.

At control step NA007, check is performed whether the base station of the minimum propagation loss is varied or not on the basis of the propagation loss LSk. If the base station of the minimum propagation loss is not varied, further check is performed at control step NA001 whether the soft hand over base station is varied. If the soft hand over base station is not varied, "Null" namely nil information is set as the base station number assignment information BSNCI at control step NA004.

When the base station of the minimum propagation loss is varied as checked at control step NA007 or when the soft hand over base station is varied as checked at control step NA001, the base station numbers are assigned temporarily to respective of base stations (assigned the base station number k) in soft hand over in the similar manner as that at control step NA003 of FIG. 24. In the embodiment of FIG. 24, only when the soft hand over base station is varied, base station number assignment process is performed. In contrast to this, in the shown embodiment of FIG. 27, even when the base station of minimum propagation loss is varied, variation of assignment of the base station number is performed. By this, the base station number i=i0 which is difficult to be erroneously detected as the power decreasing number "0", can be set for the base station having small propagation loss to the mobile station and constantly satisfying the foregoing formula (5). Accordingly, accurate transmission power control becomes possible.

Figure 19:
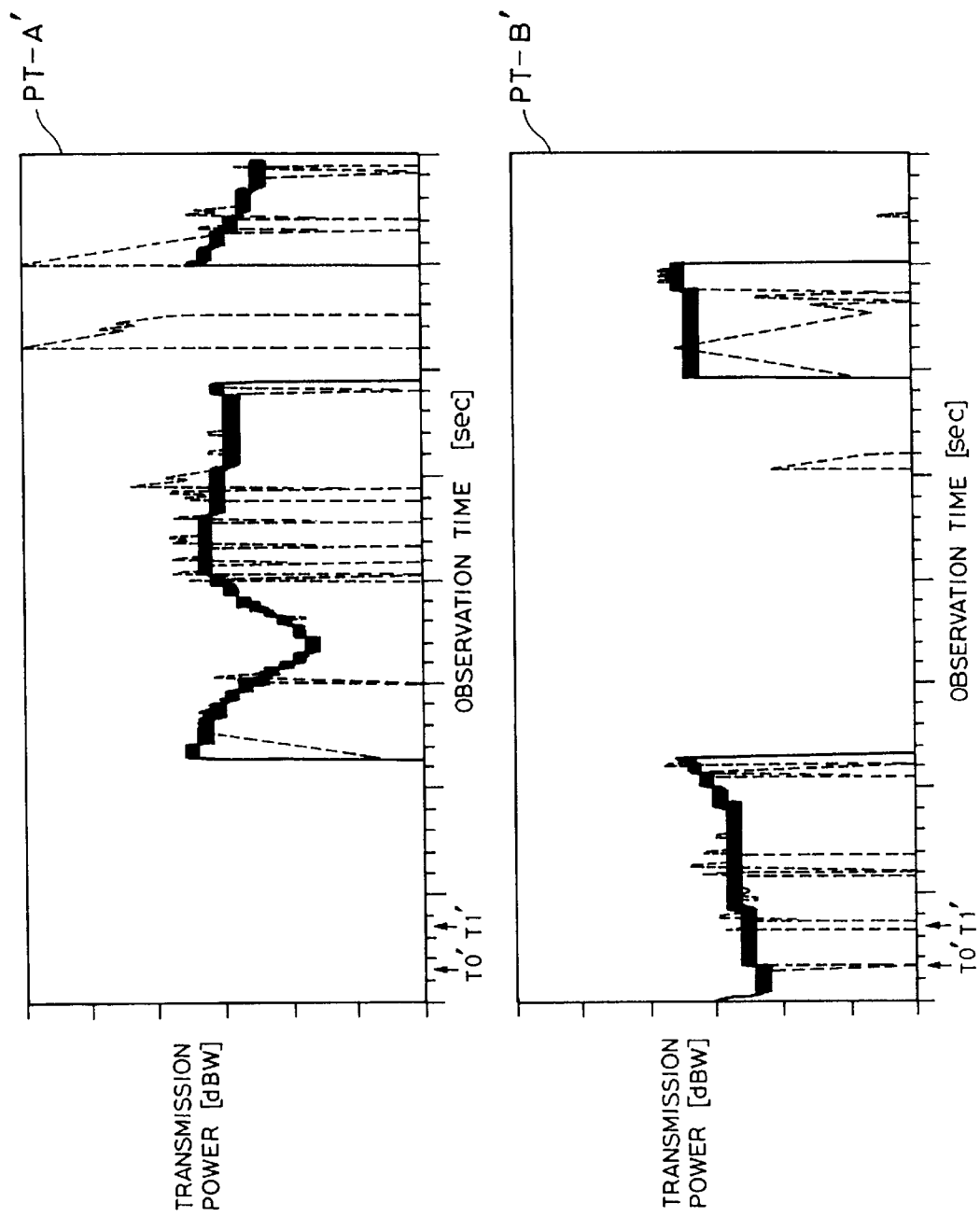
FIG. 19 is an illustration showing examples of variation of the transmission power PT-A and PT-B in time in each base station when the prior art is applied upon soft hand over between the mobile station and two base stations BS-A and BS-B.
Figure 28:
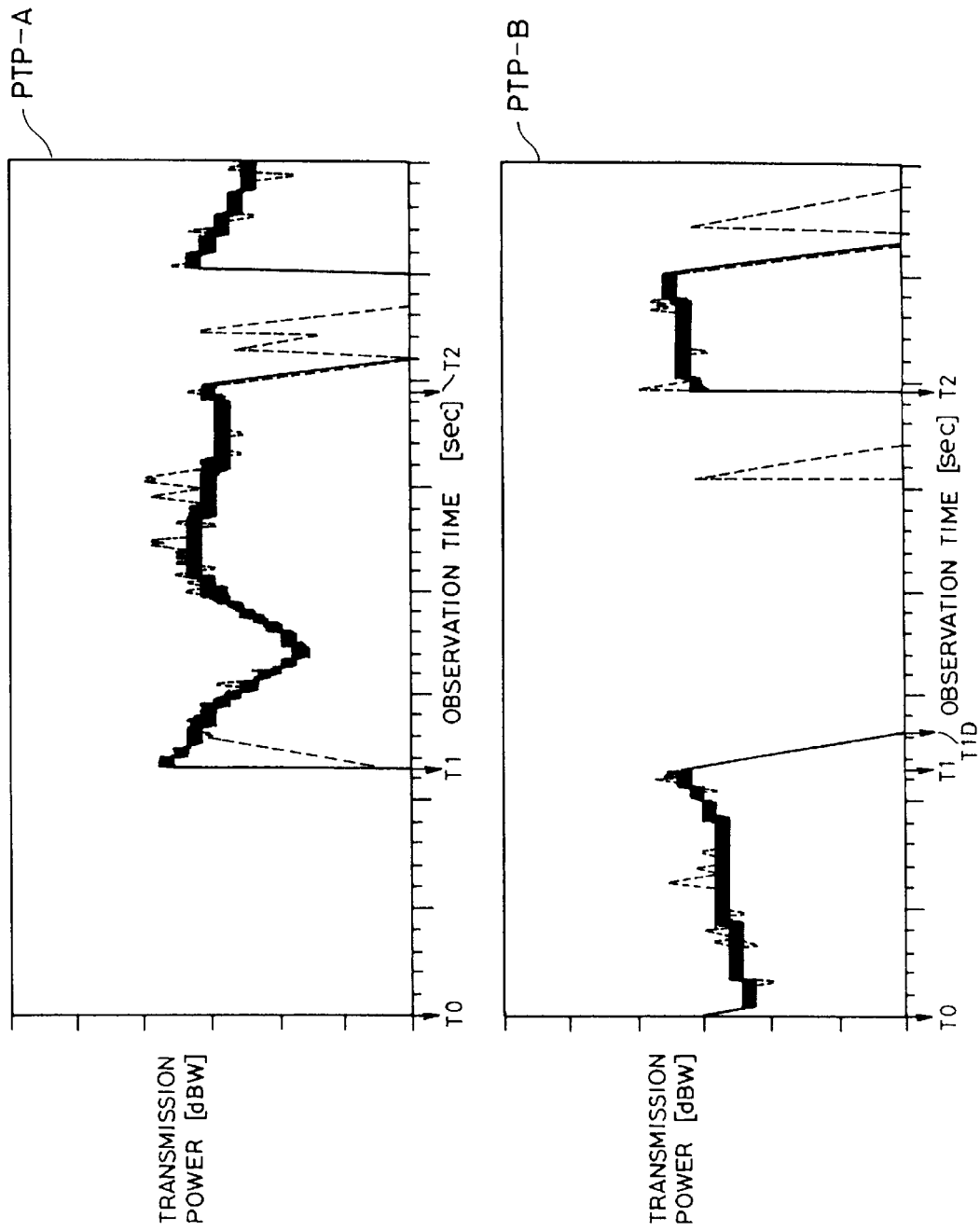
FIG. 28 is an illustration showing examples of variation of the transmission power PT-A and PT-B in time in each base station when the present invention is applied upon soft hand over between the mobile station and two base stations BS-A and BS-B.

The operation of the shown embodiment of the base station transmission power control system will be discussed with reference to FIG. 28. FIG. 28 illustrates time transition PTP-A and PTP-B of the transmission power in each base station in the case where the embodiment of the base station number information portion 13 shown in FIG. 26 is applied. In FIG. 28, the vertical axis represents a base station transmission power [dBW] and the horizontal axis represents a time [sec]. FIG. 28 corresponds to FIG. 34 showing the result obtained by the conventional transmission power control system and FIG. 19 showing the result of the former embodiment. The propagation loss threshold value PMBSth is assumed as 1, respective base station number 1 and 2 are assigned for respective base stations BS-A and BS-B during observation period shown in FIG. 28, in which soft hand over base station is not varied. In FIG. 28, the solid link shows the case where reception error in receiving the transmission power control signal is not caused and the dotted link shows the case where reception error in receiving the transmission power control signal is caused.

In the shown embodiment of the transmission power control method shown in FIG. 28, during a period from a timing T0 [sec] to T1 [sec], the base station BS-B exclusively perform transmission as shown by time dependent variation PTP-B. Then, the base station BS-A performs transmission with minimum transmission power. Upon switching of the base station at the timing T1, instead of instantly attenuating the transmission power of the former base station connected before switching to the minimum value, the transmission power is moderately attenuated over a period of timing T1D to T1 [sec].

During the period from T1 to T2 of the time dependent variation PTP-B, there is shown an occurrence of temporary increase of the transmission power. This is caused by erroneous selection of the base station by reception error of the transmission power control signal. However, the transmission power is quickly attenuated, continuous excess or lacking of the transmission power as observed in FIG. 34, is not observed.

On the other hand, in FIG. 24, the problem that the transmission power of all of the base stations become minimum transmission power during soft hand over as observed in the former embodiment of FIG. 19, can be avoided, and thus occurrence of significant degradation of the reception quality due to lowering of the reception intensity of the desired signal in the mobile station can be avoided.

In the transmission power control method shown in FIG. 19, both of two base stations BS-A and BS-B constantly output transmission waves without restriction. On the other hand, as shown in FIG. 28, in the shown embodiment of the transmission power control system, one of the base stations is selected depending upon the reception level of the pilot signal received by the mobile station. Then the selected one of the base station outputs the transmission wave, and output of the transmission wave of the other base station is restricted. Namely, by the shown system, a plural base station transmission causing problem in down link during soft hand over can be avoided to suppress interference.

Figure 29:
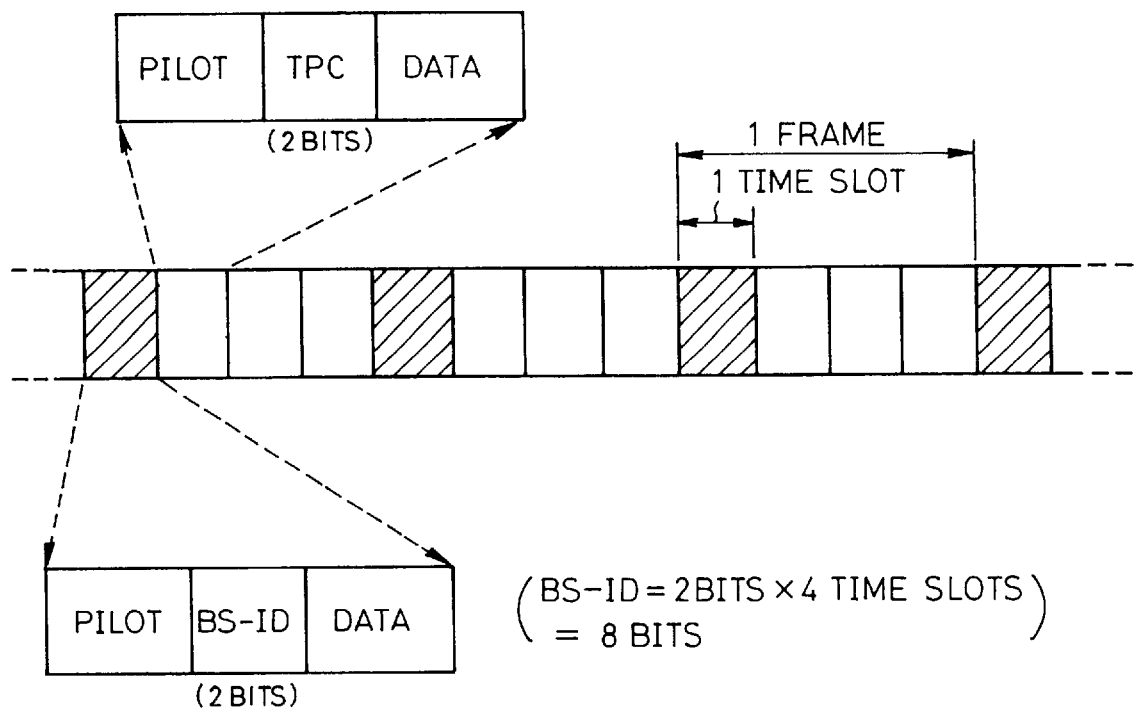
FIG. 29 is a chart of format showing a transmission side of the transmission power control information symbol.

Another embodiment of transmission method of the transmission power control information (TPC) symbol Spct generated in the transmission power control information symbol generating portion 12 of the mobile station will be discussed with reference to FIG. 29. A transmission frame is consisted of four time slots. As shown by hatching, the leading time slot is consisted of the pilot signal (PILOT), a base station identification number information (BS-ID) of two bit as the base station index and the transmission information (DATA). On the other hand, each of remaining three time slots is consisted of the pilot signal (PILOT), two bit transmission power control information (TPC) and transmission information (DATA).

The transmission power control information (TPC) uses respective two bits of three time slots, respectively. On the other hand, the base station identification number information (BS-ID) represents one base station index with total 8 bits of respective 2 bits of four time slots as shown by hatching.

By the foregoing embodiment, upon restricting transmission power of the base station other than the base station having small propagation loss with the mobile station among the base station group during soft hand over, the transmission power is not restricted abruptly but is moderately attenuated. Thus, even when error is caused in selection of the base station, abrupt lowering of reception intensity of the desired wave in the mobile station can be avoided.

On the other hand, instead of assigning transmission for all base stations during soft hand over, one or several base stations are assigned for transmission for reducing influence of transmission by inappropriate transmission power due to reception error of the transmission power control signal by the effect of spatial diversity. On the other hand, when each base station manages the virtual base station transmission power value and set as set target of the output value of the transmission power value in new base station upon switching of assignment of the base station assigned for transmission, degradation of quality or excessive quality in the mobile station can be successfully prevented.

Furthermore, by performing transmission to the mobile station from limited number of base stations instead of all base stations during soft hand over, interference of down link can be eliminated. From the result set forth above, by application of the transmission power control system according to the present invention, high down link capacity can be achieved.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A base station transmission power control system in a code division multi access cellular mobile radio communication system comprising a plurality of base stations respectively announcing unique pilot signals and a mobile station which is capable of simultaneously establishing connection with a soft hand over base station group consisted of some base stations out of said base stations in the system, wherein said mobile station detecting a communication reception quality and a primary base station among sad base stations, reception level of pilot signal of which becomes maximum among pilot signals received from respective base stations in said soft hand over base station group, notifying a base station number of said primary base station as a transmission power control signal for respective of said base stations in said soft hand over base station group when said communication reception quality is lower than a desired quality, and notifying a number other than the base station number of the base stations in said soft hand over bases group when said communication reception quality is in excess of said desired quality; and each base station in said soft hand over base station group receiving said transmission power control signal and being restricted a transmission power when a content of said transmission power control signal identifies number other than own base station number;

wherein each base station in said soft hand over base station group manages two transmission power values including a first transmission power value and a second transmission power value, deceases said first transmission power value when the content of said transmission power control signal identifies number other than said base station number in said soft hand over base station group, increases said first transmission power value when the content of said transmission power control signal identifies any one of said base station number in said soft hand over base station group, selectively sets one of said first transmission power value and a minimum transmission power value as said second transmission power value, sets said first transmission power value as said second transmission power value when the content of said transmission power control signal identifies own base station number, sets said minimum transmission power value as said second transmission power value when the content of said transmission power control signal identifies said base station number in said soft hand over base station group other than own base station number, sets said first transmission power value as said second transmission power value when the content of said transmission power control signal identifies other than base station number in said soft hand over base station group and when said first transmission power value is set as said second transmission power value in the preceding time, sets said minimum power value as said second transmission power value when the content of said transmission power control signal identifies base station number other than the base station number in said soft hand over base station group and said minimum transmission power value is set as said second transmission power value in the preceding time, and takes said second transmission power value as an output value of a transmission amplifier device.

2. A base station transmission power control system in a code division multi access cellular mobile radio communication system comprising a plurality of base stations respectively announcing unique pilot signals and a mobile station which is capable of simultaneously establishing connection with a soft hand over base station group consisted of some base stations out of said base stations in the system, wherein said mobile station detecting a communication reception quality and a primary base station among said base stations, reception level of pilot signal of which becomes maximum among pilot signals received from respective base stations in said soft hand over base station group, notifying a base station number of said primary base station as a transmission power control signal for respective of said base stations in said soft hand over base station group when said communication reception quality is lower than a desired quality, and notifying a number other than the base station number of the base stations in said soft hand over base station group when said communication reception quality is in excess of said desired quality; and each base station in said soft hand over base station group receiving said transmission power control signal and being restricted a transmission power when a content of said transmission power control signal identifies number other than own base station number;

wherein each base station of said soft hand over base station group increases the transmission power when said transmission power control signal expresses the base station number of own base station and decreases said transmission power when said transmission power control signal does not express the base station number of own base station.

3. A base station transmission power control system in a code division multiple access cellular mobile radio communication system comprising:

a plurality of base stations respectively announcing unique pilot signals and a mobile station which is capable of simultaneously establishing connection wit a soft hand over base station on group including some of base stations out of said base stations in the system, wherein said mobile station detects a communication reception quality and a primary base station among said base stations, reception level of pilot signal of which becomes maximum among pilot signals received from respective base stations in said soft hand over base station group, sets a power increasing symbol in a transmission power control bit when said communication reception quality dose not exceed a desired quality, sets a power decreasing symbol in the transmission power control bit when said communication reception quality exceeds said desired quality, transmits said transmission power control bit to said soft hand over base station group and intermittently transmits said primary base station number, and each base station in said soft hand over base station group receives said transmission power control signal which includes a primary base station number, and restricts a transmission power of own station following to the current timing when said primary base station number is not consistent with own base station, and wherein each base station in said soft hand over base station group manages at least two transmission power values including a first transmission power value and a second transmission power value, increases and decreases said first transmission power value according to said transmission power control bit contained in said transmission power control signal, sets said first transmission power value as said second transmission power value when the primary base station number is received and the received primary base station number is consistent with own base station number, sets a minimum transmission power as said second transmission power value when said primary base station number is received and the received primary base station number is not consistent with own base station number, and uses said second transmission power value as an output value of a transmission amplifier device.

4. A base station transmission power control system in a code division multiple access cellular mobile radio communication system comprising:

a plurality of base stations respectively announcing unique pilot signals and a mobile station which is capable of simultaneously establishing connection with a soft hand over base station on group including some of base stations out of said base stations in the system, wherein said mobile station detects a communication reception quality and a primary base station among said base stations, reception level of pilot signal of which becomes maximum among pilot signals received from respective base stations in said soft hand over base station group, sets a power increasing symbol in a transmission power control bit when said communication reception quality dose not exceed a desired quality, sets a power decreasing symbolin the transmission power control bit when said communication reception quality exceeds said desired quality, transmits said transmission power control bit to said hand over base station group and intermittently transmits said primary base station number, and each base station in said soft hand over base station group receives said transmission power control signal which includes a primary base station number, and restricts a transmission power of own station following to the current timing when said primary base station number is not consistent with own base station, and wherein in each base station of said soft hand over base station group increases and decreases transmission power according to said transmission power control bit contained in said transmission power control signal when said primary base station number is received and the received primary base station number is consistent with own base station number and decreases said transmission power irrespective of said transmission power control bit when the primary base station number is received and the received primary base station number is not consistent with own base station number.

5. A base station transmission power control system in a code division multiple access cellular mobile radio communication system comprising a plurality of base stations respectively announcing unique pilot signals and a mobile station which is capable of simultaneously establishing connection with a soft hand over base station on group including some of base stations out of said base stations in the system, wherein said mobile station detects a communication reception quality and a primary base station among said base stations, reception level of pilot signal of which becomes maximum among pilot signals received from respective base stations in said soft hand over base station group, sets a power increasing symbol in a transmission power control bit when said communication reception quality dose not exceed a desired quality, sets a power decreasing symbol in the transmission power control bit when said communication reception quality exceeds said desired quality, transmits said transmission power control signal including at least one of said transmission power control bit and said primary base station number to said soft hand over base station group, and each base station in said soft hand over base station group receives said transmission power control signal, and restricts a transmission power of own station when said primary base station number is not consistent with own base station number, and wherein in each base station in said soft hand over base station group manages at least two transmission power values including a first transmission power value and a second transmission power value, increases and decreases said first transmission power value according to said transmission power control bit contained in said transmission power control signal, sets said first transmission power value as said second transmission power value when the primary base station number is received and the received primary base station number is consistent with own base station number, sets a minimum transmission power as said second transmission power value when said primary base station number is received and the received primary base station number is not consistent with own base station number, and uses said second transmission power value as an output value of a transmission amplifier device.

6. A base station transmission power control system in a code division multiple access cellular mobile radio communication system comprising a plurality of base stations respectively announcing unique pilot signals and a mobile station which is capable of simultaneously establishing connection with a soft hand over base station group including some of base stations out of said base stations in the system, wherein said mobile station detects a communication reception quality and a primary base station among said base stations, reception level of pilot signal of which becomes maximum among pilot signals received from respective base stations in said soft hand over base stations group, sets a power increasing symbol in a transmission power control bit when said communication reception quality dose not exceed a desired quality, sets a power decreasing symbol in the transmission power control bit when said communication reception quality exceeds said desired quality, transmits a transmission power control signal including at least one of said transmission power control bit and said primary base station number to said soft hand over base station group, and each base station in said soft hand over base station group receives said transmission power control signal, and restricts a transmission power of own station when said primary base station number is not consistent with own base station number, and wherein each base station of said soft hand over base station group increases and decreases transmission power according to said transmission power control bit contained in said transmission power control signal when said primary base station number is received and the received primary base station number is consistent with own base station number and decreases said transmission power irrespective of said transmission power control bit when the primary base station number is received and the received primary base station number is not consistent with own base station number.

7. A cellular mobile communication system including a plurality of base stations and mobile station, comprising:

base station number assigning means for temporarily assigning base station numbers for a plurality of base stations in soft hand over with said mobile station;

base station selecting means for selecting the base station which transmits a pilot signal received by said mobile station at a maximum reception intensity among pilot signals transmitted from said base station in soft hand over;

transmission power control signal transmitting means for using a base station number of the selected base station as a transmission power control signal to be transmitted to said base station group in soft hand over from said mobile station; and transmission power control means for controlling the transmission power of said base station on the basis of said transmission power control signal, the transmission power of the base station other than the selected base station being controlled for sequentially attenuating toward a predetermined minimum power with a given attenuation amount;

wherein said transmission power control means includes virtual power management means for managing a virtual transmission power value premised for the case where the base station is constantly selected irrespective of selection of said base station and transmission power determining means for using said virtual transmission power value as said transmission power value of the base station.

8. A cellular mobile communication system as set forth inn claim 7, wherein said virtual power management means increases the transmission power when said base station number transmitted by said transmission power control signal transmitting means is the base station number of any of the base station in soft hand over and decreases otherwise.

9. A communication control method in a cellular mobile communication system including a plurality of base stations and mobile station, comprising:

base station number assigning step of temporarily assigning base station numbers for a plurality of base stations in soft hand over with said mobile station;

base station selecting step of selecting the base station which transmits a pilot signal received by said mobile station at a maximum reception intensity among pilot signals transmitted from said base station in soft hand over;

transmission power control signal transmitting step of using a base station number of the selected base station as a transmission power control signal to be transmitted to said base station group in soft hand over from said mobile station; and transmission power control step of controlling the transmission power of said base station on the basis of said transmission power control signal, the transmission power of the base station other than the selected base station being controlled for sequentially attenuating toward a predetermined minimum power with a given attenuation amount;

wherein said transmission power control step includes virtual power management step for managing a virtual transmission power value premised for the case where the base station is constantly selected irrespective of selection of said base station and transmission power determining step fro using said vitual transmission power value as said transmission power value of the base station.

10. A cellular mobile communication system as set forth inn claim 9, wherein said virtual power management step increases the transmission power when said base station number transmitted by said transmission power control signal transmitting step is the base station number of any of the base station in soft hand over and decreases otherwise.

11. A base station in a cellular mobile communication system temporarily assigned the base station number by a mobile station in soft hand over with said mobile station, comprising:

means for transmitting a pilot signal;

judgment means for receiving a transmission power control signal including a base station number selected as base station which ants a pilot signal received by said mobile station at a maximum reception intensity among pilot signals transmitted from said base station in soft hand over and making judgment whether said base station number is consistent with a number assigned to own station or not; and transmission power control means for performing sequential attenuation control of the transmission power with a given attenuation amount when said base station number and said number of own station are inconsistent with each other;

wherein said transmission power control means includes virtual power managing means for managing a virtual transmission power value in consideraton of the case where the base station is constantly selected irrespective of judgment made by said judgment means and transmission power determining means for using said virtual transmission power value as the transmission power value of the relevant base station when a certain base station is seleted.

12. A base station as set forth in claim 11, wherein said virtual power management means increases the transmission power when said base station number is any one of the base station number in soft hand over, and decreases otherwise.

* * * * *